United States Patent
Huang et al.

[11] Patent Number: 5,809,166
[45] Date of Patent: Sep. 15, 1998

[54] CHARACTER RECOGNITION SYSTEM WHICH CUTS BETWEEN TOUCHING CHARACTERS

[75] Inventors: Hung Khei Huang, Lake Forest; Toshiaki Yagasaki, Irvine, both of Calif.

[73] Assignee: Canon Kabushiki Kaisha, Tokyo, Japan

[21] Appl. No.: 962,974

[22] Filed: Oct. 28, 1997

Related U.S. Application Data

[63] Continuation of Ser. No. 337,538, Nov. 9, 1994, abandoned.

[51] Int. Cl.⁶ ........................................ G06K 9/34
[52] U.S. Cl. ........................ 382/178; 382/174; 382/178; 382/195
[58] Field of Search ................... 382/156, 171, 382/174, 177–179, 193, 196, 187

[56] References Cited

U.S. PATENT DOCUMENTS

| | | | |
|---|---|---|---|
| 3,346,845 | 10/1967 | Fomenko | 382/193 |
| 3,868,636 | 2/1975 | Schlang | 382/193 |
| 4,918,740 | 4/1990 | Ross | 382/171 |
| 4,998,285 | 3/1991 | Suzuki et al. | 382/171 |
| 5,033,097 | 7/1991 | Nakamura | 382/174 |
| 5,033,098 | 7/1991 | Tanaka | 382/171 |
| 5,046,114 | 9/1991 | Zobel | 382/171 |
| 5,048,097 | 9/1991 | Gaborski | 382/156 |
| 5,321,770 | 6/1994 | Huttenlocher et al. | 382/174 |
| 5,384,864 | 1/1995 | Spitz | 382/174 |

*Primary Examiner*—Joseph Mancuso
*Assistant Examiner*—Marc Bobys
*Attorney, Agent, or Firm*—Fitzpatrick, Cella, Harper & Scinto

[57] ABSTRACT

An optical character recognition system cuts between touching characters. A first cut is made between touching characters based on white spaces, and the cut characters are subjected to character recognition processing. All characters not recognized are then cut again. A pair of adjacent vertical bars is detected in a vertical histogram of character image data of unrecognized characters, the vertical bars having a vertical component in the histogram that exceeds a predetermined vertical threshold. Horizontal crossings are detected in each of three discrete horizontal bands between the vertical bars. The vertical bars are classified according to the detected horizontal crossings, and, based on the classification, a decision is made whether or not to cut between the vertical bars, and where to cut between the vertical bars.

120 Claims, 10 Drawing Sheets

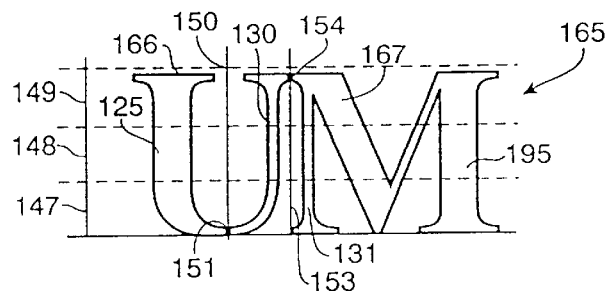
FIG. 5(a)
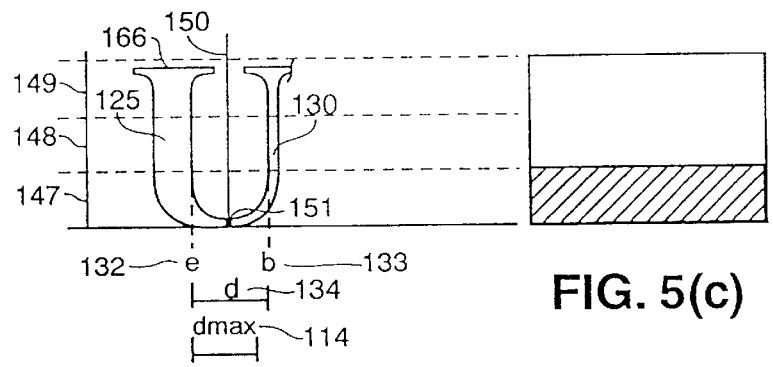
FIG. 5(b)
FIG. 5(c)
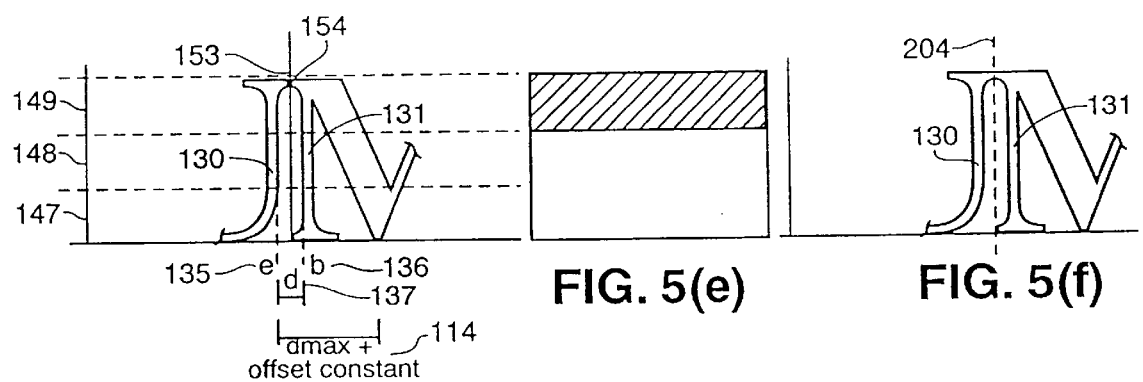
FIG. 5(d)
FIG. 5(e)
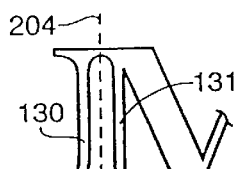
FIG. 5(f)

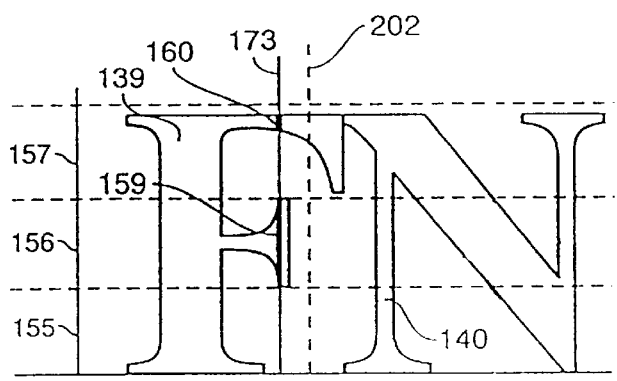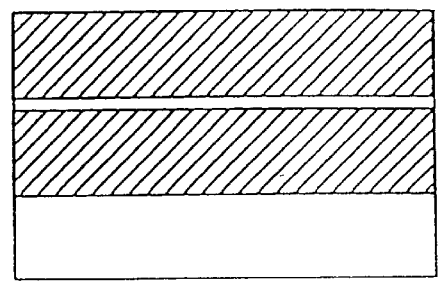
FIG. 12(a)  FIG. 12(b)
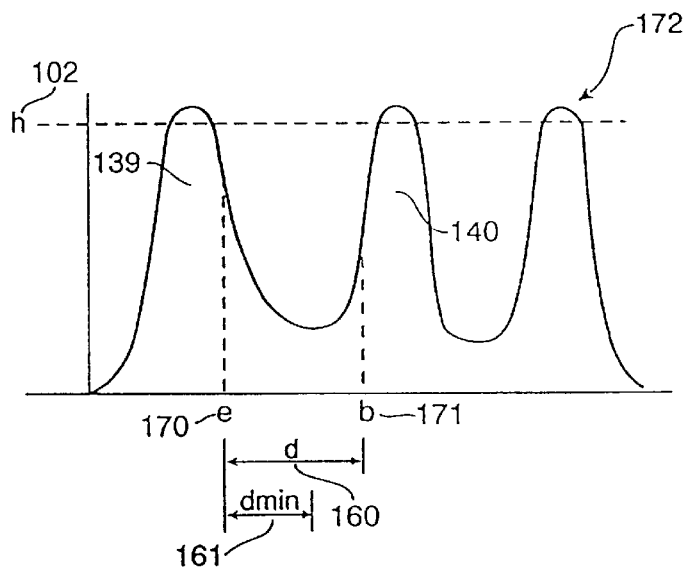
FIG. 12(c)

CHARACTER RECOGNITION SYSTEM WHICH CUTS BETWEEN TOUCHING CHARACTERS

This application is a continuation of application Ser. No. 08/337,538 filed Nov. 9, 1994, now abandoned.

BACKGROUND OF THE INVENTION

1. Field of the Invention

The present invention relates to a character recognition system which cuts (or "segments") individual characters out of image data which includes touching characters.

2. Description of the Related Art

In character recognition systems, a document on which plural characters are formed is scanned to create an image of the document, the document's image is segmentation-analyzed to cut out images of individual characters, each of the character images are compared against predetermined standard character patterns to find a match, and a character identity is output when a match is found.

Many techniques have been proposed for segmentation-analysis of document images so as to cut out images of individual characters. Most of these techniques depend on the presence of space between adjacent character images, and these techniques therefore do not cut between character images that touch each other. As a result, for touching characters, instead of comparing a single character image against the predetermined character patterns, two or more touching character images are compared. Since no one predetermined character pattern matches the touching characters, recognition fails for those touching characters.

In a document having characters formed at a fixed pitch, such as a typewritten documents, touching characters are rare and recognition accuracy is relatively high. However, for a document having proportionally-spaced characters, such as type-set documents like issued patents, newspapers, and magazines, touching characters are more frequent and their incidence increases for adjacent capital letters. For example, in the proportionally-spaced character sequence "LIFT", it is common for "L" and "I" to touch and for "F" and "T" to touch. Since conventional character cutting techniques fail to cut between such touching characters, recognition accuracy for proportionally-spaced characters, especially capital letters, is relatively low.

To increase recognition accuracy, there therefore exists a need for a cutting technique which cuts between touching characters.

One cutting technique, which cuts between touching characters, generates a projection contour of input character data, and, based on factors such as a number of peaks in the projection contour, height of the peaks, spread of the peaks, width of the peaks, depth of valleys in the projection contour, smoothness of the valleys, and symmetry of smoothed vertical projection curves generated from the projection contour, determines where touching character areas are located in the input character data. A valley function is then used to determine where to cut any detected touching character areas. One problem with this technique is that certain touching character combinations cannot be distinguished from certain characters. For example, the projection contour for an "LI" character combination cannot be distinguished from the projection contour for a "U" character. As a result, character cutting is not performed, and, therefore, successful character recognition cannot be achieved.

There therefore exists a need for improvements in cutting techniques for touching characters, particularly for cutting techniques tailored for touching capital letters.

SUMMARY OF THE INVENTION

The present invention addresses the aforementioned need by providing a character recognition system which includes a method and an apparatus for cutting between touching characters by classifying the space between pairs of vertical line strokes in such touching characters.

In one aspect, the present invention is a method and an apparatus for cutting individual characters out of character image data which includes at least two touching characters. A first pair of vertical bars is detected in the character image data and each of plural discrete horizontal bands located between the first pair of vertical bars is checked for the presence of image data. The first pair of vertical bars are classified based on which of the horizontal bands contain image data and, based on the classification, it is determined whether and where to cut between the vertical bars.

Because the foregoing character cutting method cuts character areas according to a classification of the space between a pair of vertical bars in a character area, and not according to character width, accurate cutting of touching characters is possible, and touching characters such as "LI" can be cut without performing excessive computation and without making erroneous cuts in a character such as "U". Additionally, because the foregoing invention cuts character areas according to a classification system, the frequency of character cutting errors is decreased.

In preferred embodiments, the invention is included in a character recognition system which, before applying the above character cutting technique, first applies a cutting technique which cuts between non-touching characters. Then, the above cutting technique is applied to unrecognized character images under the assumption that such unrecognized character images are images of touching characters. If desired, other cutting techniques for touching characters may also be applied; and the process of applying cutting techniques to unrecognized characters may be repeated several times or until all characters have been successfully recognized.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 5(a), 5(b), 5(c), 5(d), 5(e), and 5(f) show examples of class 4 and class 1 vertical bar combinations and pictorially represent both cutting and not cutting characters using the character cutting technique of the present invention.

FIGS. 12(a), 12(b) and 12(c) show an example of a class 2 vertical bar combination and pictorially represent cutting characters using the character cutting technique of the present invention.

DETAILED DESCRIPTION OF THE PREFERRED EMBODIMENT

Figure 1:
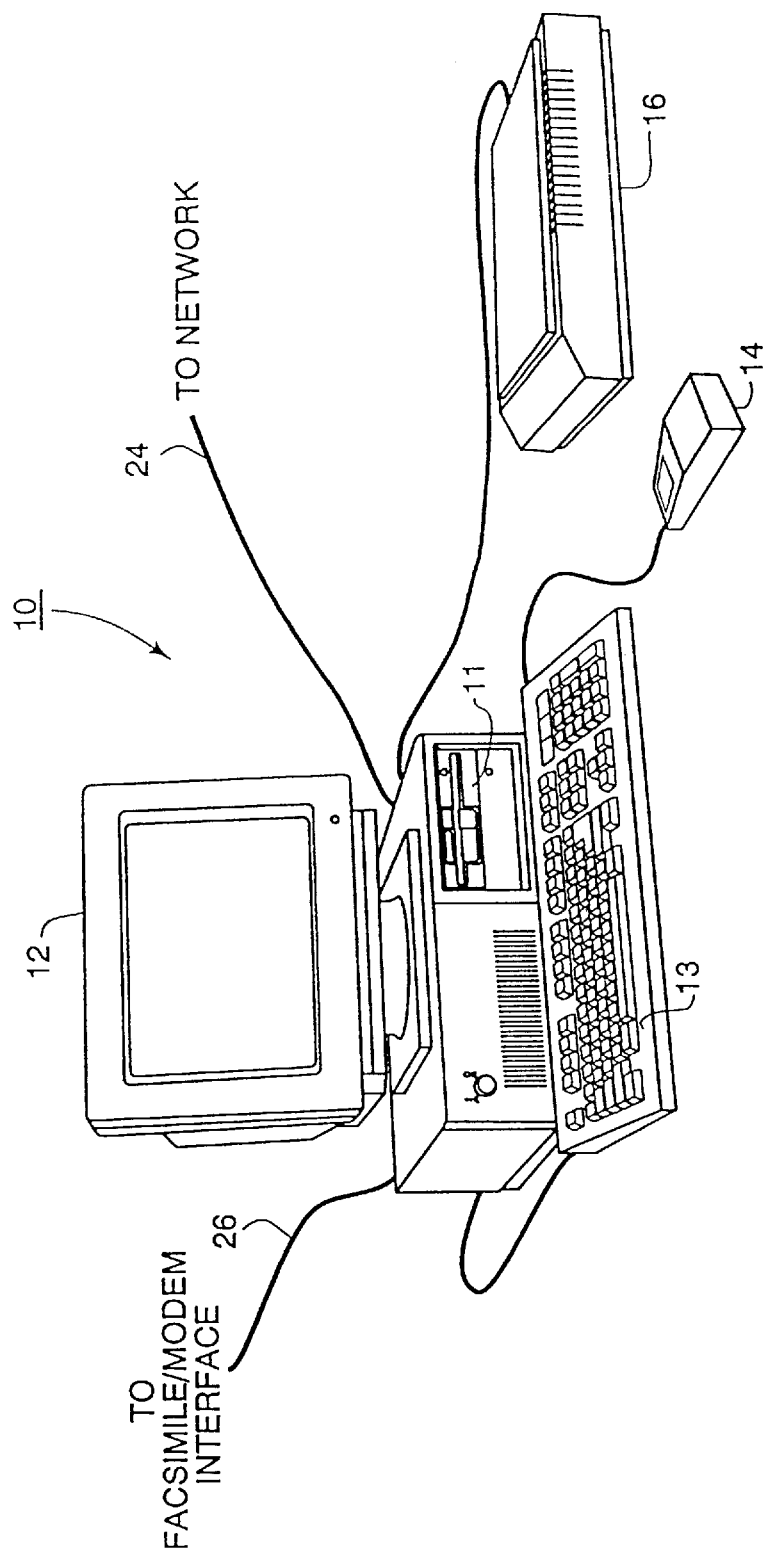
FIG. 1 shows a perspective view of computer hardware used in an operation of the optical character recognition system of the present invention.

FIG. 1 is a view showing the outward appearance of a representative embodiment of the present invention. Shown in FIG. 1 is computing equipment 10, such as a MacIntosh or an IBM PC-compatible computer having a windowing environment, such as Microsoft® Windows. Provided with computing equipment 10 is display screen 12, such as a color monitor, keyboard 13 for entering text data and user commands, and pointing device 14, such as a mouse, for pointing and for manipulating objects displayed on screen 12.

Computing equipment 10 includes a mass storage device such as computer disk 11 for storing data files which can include document image data, text data files, and other data files in compressed or uncompressed format, and for storing application programs such as a character recognition program, a word or spreadsheet processing program, or other information processing programs, which contain stored program instructions by which computing equipment 10 manipulates and stores data files on disk 11 and presents data in those files to an operator via display screen 12.

Image data is input by scanner 16 which scans documents or other images and provides bit map images of those documents to computing equipment 10. Data may also be input into computing equipment 10 from a variety of other sources such as network interface 24 or from other external devices via facsimile/modem interface 26.

It should be understood that, although a programmable general-purpose computer arrangement is shown in FIG. 1, a dedicated or stand-alone computer or other type of data processing equipment can be used in the practice of the present invention.

Figure 2:
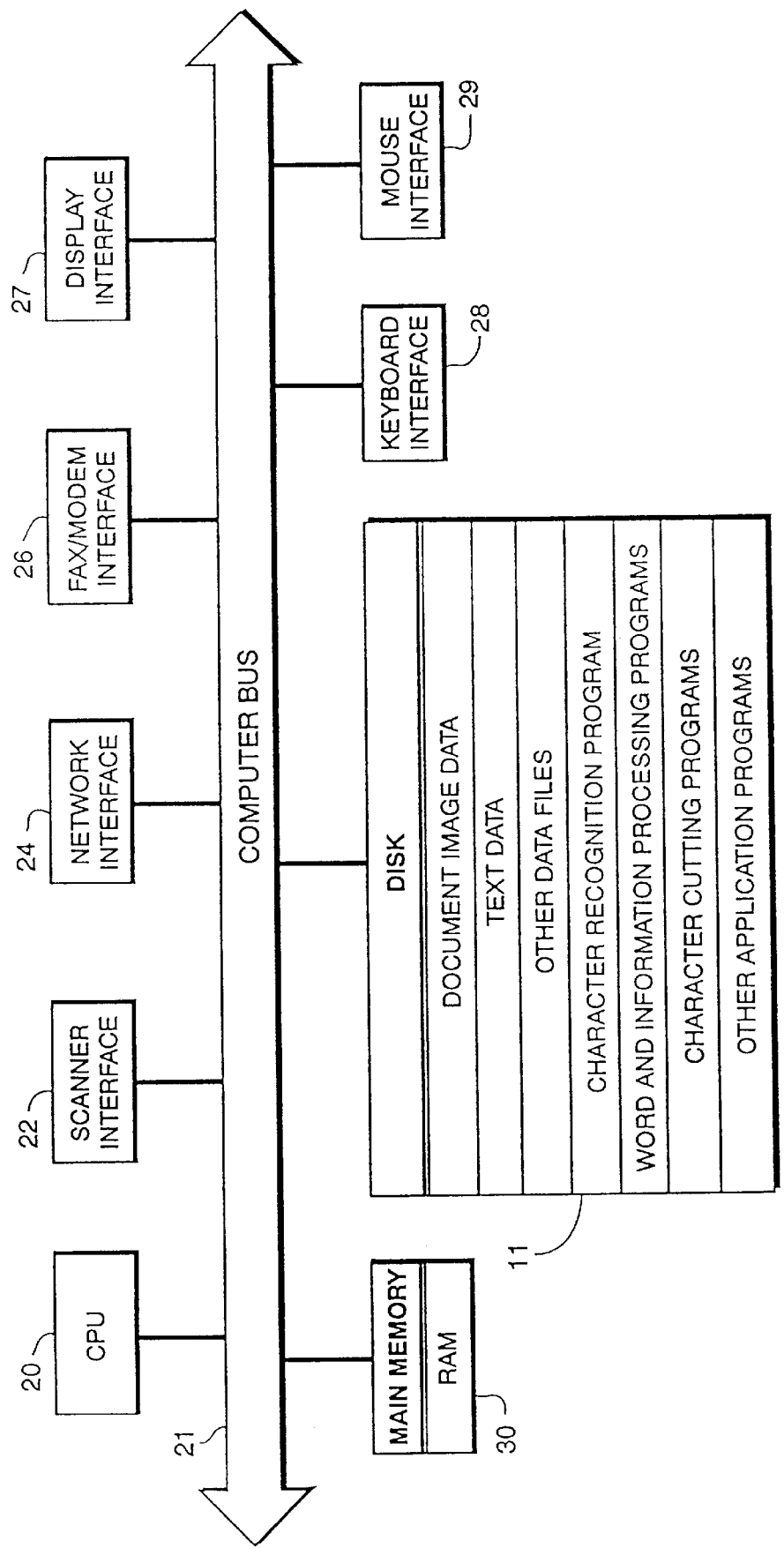
FIG. 2 shows a block diagram of the optical character recognition system depicted in FIG. 1.

FIG. 2 is a detailed block diagram showing the internal construction of computing equipment 10. As shown in FIG. 2, computing equipment 10 includes a central processing unit (CPU) 20 interfaced with computer bus 21. Also interfaced with computer bus 21 is scanner interface 22, network interface 24, fax/modem interface 26, display interface 27, keyboard interface 28, mouse interface 29, main memory 30, and disk 11.

Main memory 30 interfaces with computer bus 21 so as to provide random access memory storage for use by CPU 20 when executing stored program instructions such as character cutting programs, character recognition programs, word and information processing programs, and other application programs. More specifically, CPU 20 loads those programs from disk 11 into main memory 30 and executes those stored programs out of main memory 30.

Figure 3:
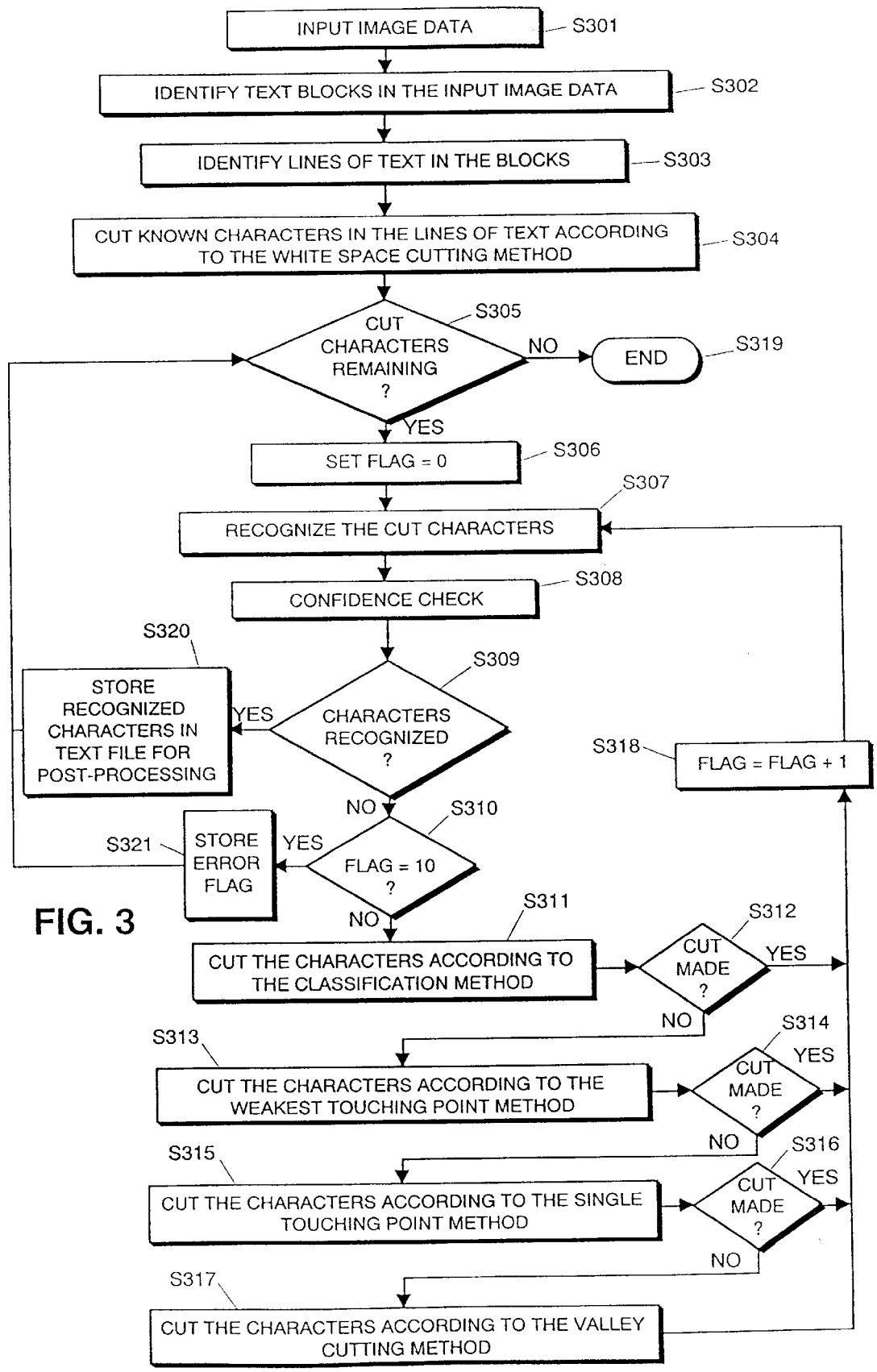
FIG. 3 shows a flow diagram of the optical character recognition system of the present invention.

FIG. 3 shows a flow diagram of the optical character recognition system of the present invention. The process steps in FIG. 3 are stored on disk 11, as described above, and executed by CPU 20 out of main memory 30.

In step S301, a user inputs image data into the optical character recognition system of the present invention. The image data can be input by the means described above including scanning a document with scanner 16, and can represent a variety of images, including text and pictures.

Step S302 identifies text blocks in the input image data using a block selection technique, such as that disclosed in U.S. patent application Ser. No. 08/171,720, the contents of which are hereby incorporated by reference into the present application. Step S303 identifies individual lines of text in the text blocks. Step S304 cuts out characters in a line of text according to a conventional white space cutting method. That is, white spaces in the text lines are identified and, based on locations of the white spaces, each character in a line of text is cut from the line. Step S305 determines whether all characters cut by the white space cutting method have been processed. If this is the case, then flow proceeds to step S319 where optical character recognition of the input image data ends. However, if all characters cut by the white space cutting method have not been processed, then flow proceeds to step S306. Step S306 initializes a flag used to determine when steps S311 to S317 have gone through ten iterations. Flow then proceeds to step S307.

In step S307, a cut character area is recognition processed so as to identify the character, and step S308 checks the results of the recognition to ensure that the recognition was properly performed. If it is determined that the recognition was properly performed, flow proceeds from step S309 to step S320 where the character identity is stored in a text file for use by other information processing programs, after which flow proceeds to step S305. When all characters in the document are processed, as determined in step S305, flow ends. If step S308 determines that the recognition was not properly performed, then flow proceeds from step S309 to step S310.

Step S310 determines whether the character cutting routines of steps S311, S313, S315 and S317 have cut the characters area ten times. If the character cutting routines have cut the character area ten times, then flow proceeds to step S321 where it is determined that further processing will not yield any further information. Accordingly, step S321 stores an error flag in the file. Flow then returns to step S305 until all character images have been processed.

If the character cutting routines of steps S311, S313, S315 and S317 have not cut the character area ten times, then flow proceeds to steps S311 to S317 where one of the character cutting routines cuts the character area.

In step S311, the character cutting method of the present invention (the "classification method") is applied to the character area. This method is described in detail in FIG. 4. Step S312 determines whether a cut was made in step S311. If it is determined that a cut was made, flow proceeds to step S318 which increments a flag to indicate a cut was made. If, however, a cut was not made in step S311, flow proceeds to step S313.

In step S313, a conventional weakest touching point character cutting method is applied to the character area. The weakest touching point character cutting method cuts between two touching characters in a character area at a point where a vertical component of a vertical histogram of the character area is at a minimum. Step S314 determines whether a cut was made in step S313. If it is determined that a cut was made, flow proceeds to step S318 which increments a flag to indicate a cut was made. If, however, a cut was not made in step S313, flow proceeds to step S315.

In step S315, a conventional single touching point character cutting method is applied to the character area. The single touching point character cutting method cuts between two touching characters in a character area at a vertical line where only a single point in the touching characters intersects the vertical line. For example, in an "OO" touching character combination, a single point intersects a vertical line on the characters only at a point where the characters touch. Therefore, a cut is made along the vertical line. Step S316 determines whether a cut was made in step S315. If it is determined that a cut was made, flow proceeds to step S318 which increments a flag to indicate a cut was made. If, however, a cut was not made in step S315, flow proceeds to step S317.

In step S317, a conventional valley-on-the-character-upper-profile (or "valley") character cutting method is applied to the character area. The valley character cutting method cuts a touching character pair at a point determined by a valley function, after which flow proceeds to step S318 which increments a flag.

The present invention is not limited to the character cutting routines described in the present embodiment. That is, other character cutting routines may be used in addition to, or instead of, those described above, and one or more of the above conventional character cutting routines may be left out.

After the flag is incremented in step S318, flow proceeds to step S307 which recognizes the cut characters. The above process is repeated until the characters have been cut and recognized ten times or until the characters are successfully recognized, after which flow proceeds to step S321 which stores an error flag in a text file or to step S320 which stores recognized characters. Flow then returns to step S305 until all character areas have been processed.

Figure 4A:
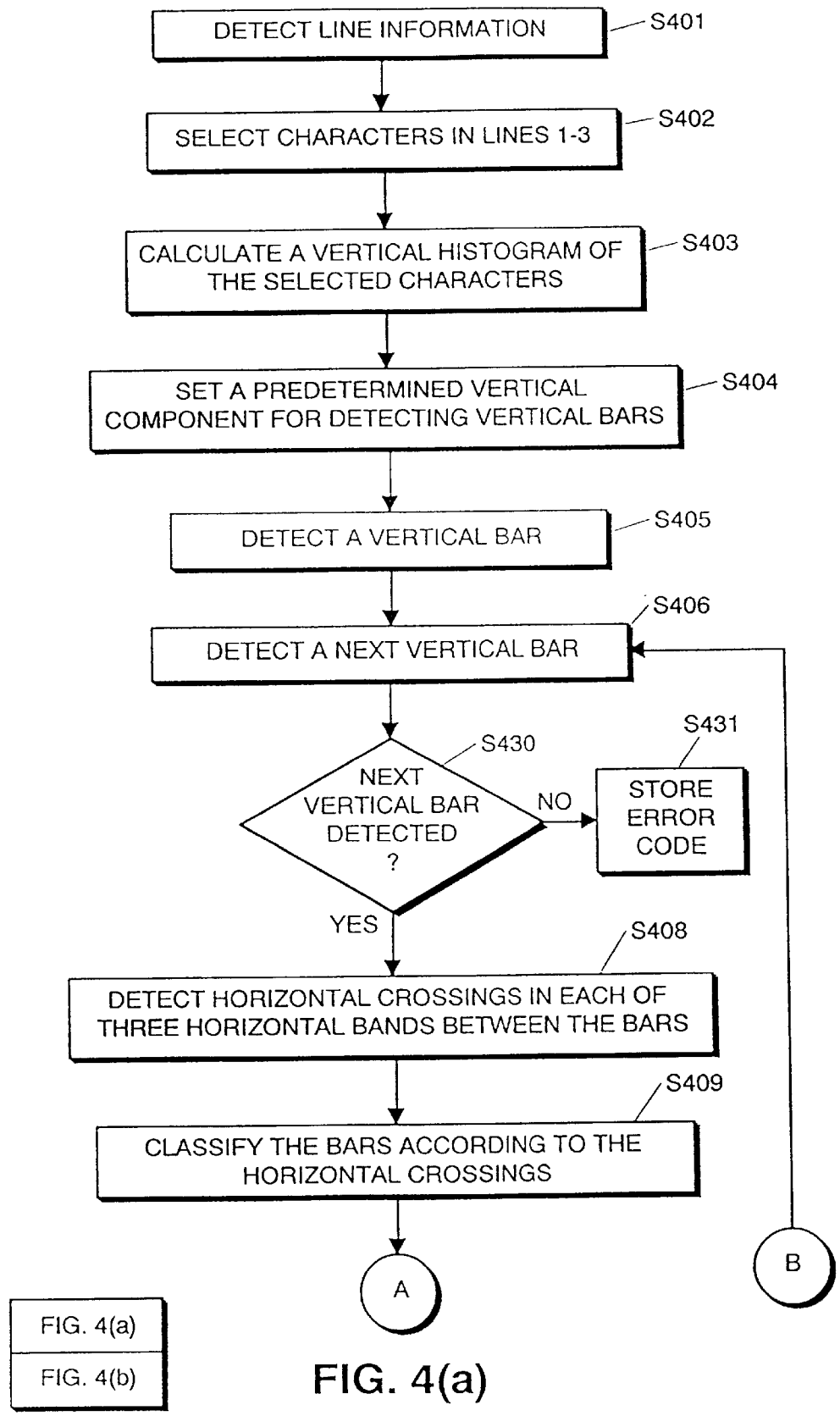
FIG. 4, comprised of FIG. 4(a) and FIG. 4(b), shows a flow diagram of the character cutting technique of the present invention.
Figure 4B:
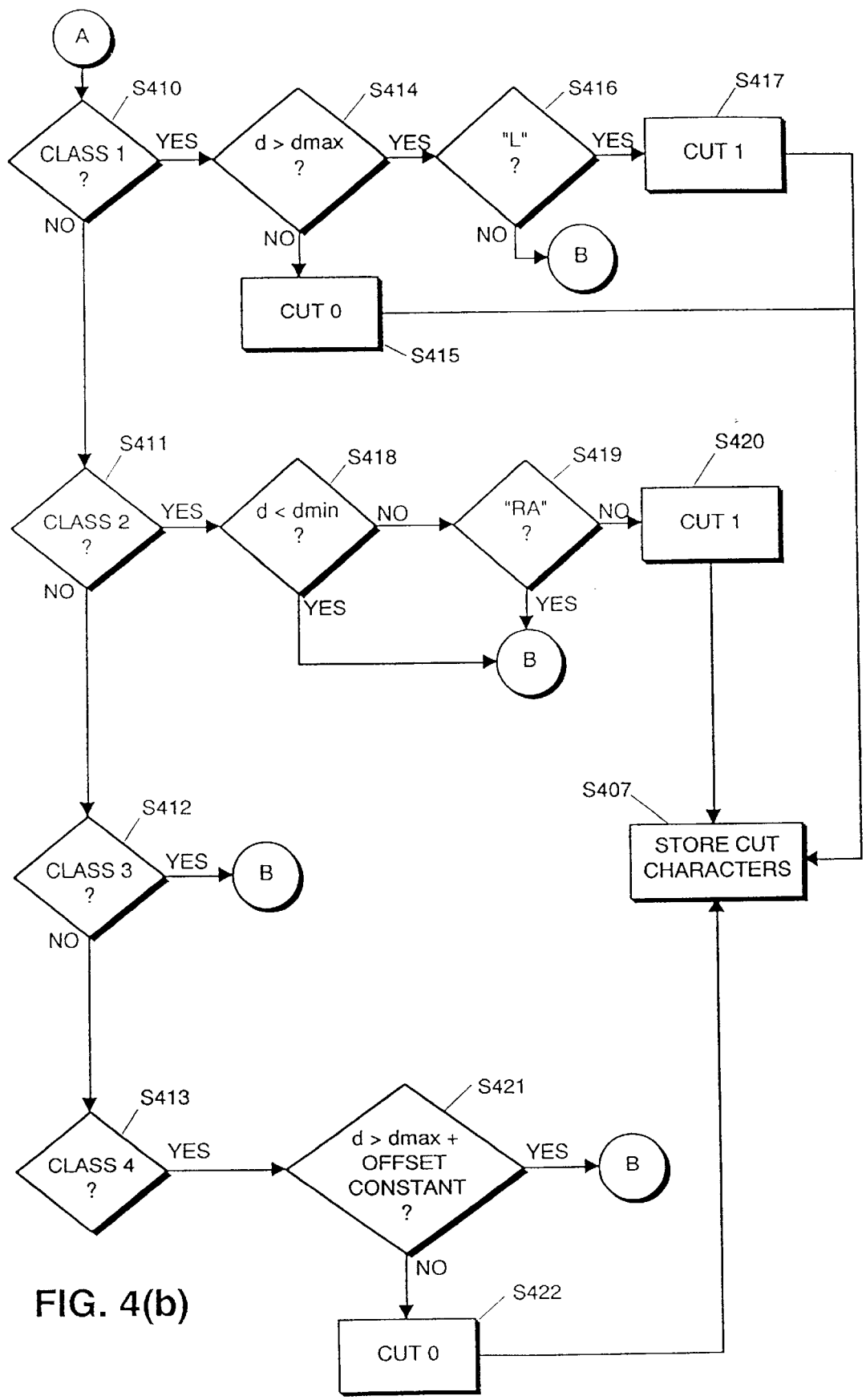

FIG. 4, comprised of FIGS. 4(a) and 4(b), shows a flow diagram of the character cutting method of the present invention referenced in step S311. According to the flow diagram shown in FIG. 4, a first pair of vertical bars is detected in character image data and a presence of image data in each of plural discrete horizontal bands located between the first pair of vertical bars is checked. The first pair of vertical bars is classified based on which of the horizontal bands contain image data and, based on the classification, it is determined whether and where to cut between the vertical bars. The individual steps of the method shown in the flow diagram of FIG. 4 are described below.

Figure 6:
FIG. 6 shows a representative text line.

Step S401 detects line information in a character area input from step S310. More specifically, four horizontal lines, namely lines 1, 2, 3, and 4, shown in FIG. 6, are defined for the character area. Line 1 is a maximum character height. Line 2 is a maximum lower-case character height for small lower-case characters such as "a". Line 3 is a character baseline. Line 4 is a maximum character extension below baseline 3 for lower-case characters such as "j". Step S401 determines the location of those lines for the character area input from step S310. Step S402 selects, for further processing, character areas found to extend between lines 1 and 3. For example, in step S402, "W", shown in FIG. 6, which extends only between lines 1 and 3 would be selected for further processing whereas "a", shown in FIG. 6, which extends only between lines 2 and 3, and "g", also shown in FIG. 6, which extends only between lines 2 and 4, would not be selected. Portions not selected are not processed by the cutting method of step S311, but they are, of course, processed by one of the cutting methods of steps S313, S315, and S317.

Figure 7:
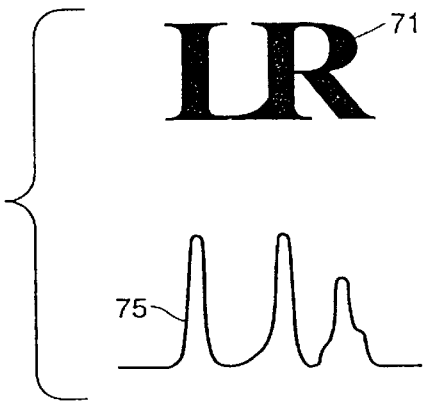
FIG. 7 shows an example of touching characters and a histogram derived therefrom.

Steps S403 to S406 detect the presence of a first pair of vertical bars in character areas selected in step S402. Specifically, step S403 calculates a vertical histogram depicting a selected character area. FIG. 7 shows an example of a vertical histogram 75, calculated from "LR" touching character combination 71 and FIG. 10(d) shows another example of a vertical histogram 103, calculated from "LI" touching character combination 101, shown in FIG. 10(a).

Step S404 sets a predetermined vertical component for detecting a vertical bar in the histogram, and step S405 detects a vertical bar in the histogram which has a vertical component that exceeds the predetermined vertical component. FIG. 10(d) shows the predetermined vertical component 102, labelled "h", superimposed on the vertical histogram having vertical bars 107 and 108 which exceed the predetermined vertical component. For the example shown in FIG. 10(d), vertical bar 107 would be detected in step S405. Step S406 detects a next vertical bar in the histogram that exceeds the predetermined vertical component. For the example shown in FIG. 10(d), vertical bar 108 would be detected in step S406.

If a next vertical bar is not detected in step S406, the character area has ended, and flow proceeds from step S430 to step S431 where an error code, indicating that the cutting method cannot make a cut in the character area, is stored. (Flow proceeds with step S312 in FIG. 3.) If a next vertical bar is detected in step S406, flow proceeds from step S430 to step S408 which checks for a presence of image data in each of three discrete horizontal bands between the pair of vertical bars. Specifically, referring to FIG. 10(b), a first horizontal band is labeled 106, a second horizontal band is labeled 105, and a third horizontal band is labeled 104. Each of these horizontal bands is discrete since they do not overlap and they are mutually exclusive, and each horizontal band has the same height. Horizontal crossings are determined by reference to vertical line 110 positioned mid-way between the vertical bars which crosses the horizontal axis of the histogram at a point 109, labeled "x" in FIG. 10(b).

Figure 8:
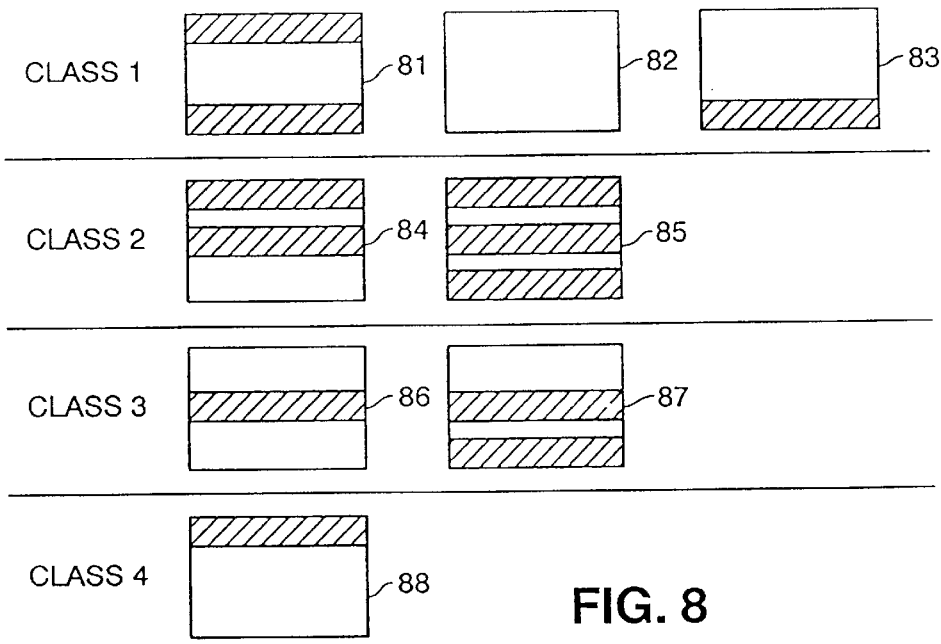
FIG. 8 shows the classification system used in the character cutting technique of the present invention.

Step S409 classifies the pair of vertical bars into one of four classes according to locations of the horizontal crossings detected in step S408. The classifications are shown in FIG. 8. As shown in FIG. 8, class 1 includes vertical bars having horizontal crossings in only the first and third horizontal bands (81), vertical bars having no horizontal crossing points (82), and vertical bars having a horizontal crossing in only the first horizontal band (83). Class 2 includes vertical bars having horizontal crossings in only the second and third horizontal bands (84) and vertical bars having horizontal crossings in all three horizontal bands (85). Class 3 includes vertical bars having a horizontal crossing in only the second horizontal band (86) and vertical bars having horizontal crossings in only the first and second horizontal bands (87). Class 4 includes vertical bars having a horizontal crossing in only the third horizontal band (88).

Flow then advances to steps S410 through S413 which determine, based on the classification, whether or not to make a cut between the pair of vertical bars, and, if a cut is made, where to make it.

Figure 9:
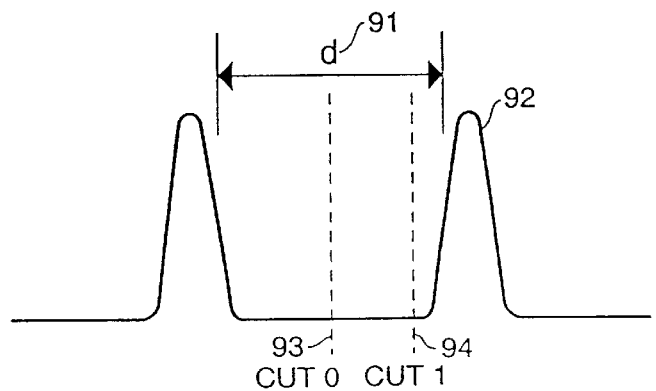
FIG. 9 shows the two cutting options, for cutting between vertical bars, used in the character cutting technique of the present invention.

If the vertical bars are classified as "class 1" in step S409, flow proceeds to step S410 and then to step S414. Step S414 calculates a distance "d" (denoted by reference number 91) shown in FIG. 9, between the endpoint of the first vertical bar and the beginning point of the second vertical bar, and compares the distance to a maximum character distance, dmax, not shown in FIG. 9. Maximum character distance dmax is a maximum distance between two vertical bars of two touching characters. If, in step S414, "d" is found not to be greater than dmax, flow proceeds to step S415 where the vertical bars are cut at "cut 0" 93 shown in FIG. 9, after which flow proceeds to step S407 which stores the cut characters. "Cut 0" 93, shown in FIG. 9, is a cutting point located at a center point between the first vertical bar and the second vertical bar.

If "d" is found to be greater than dmax, flow proceeds to step S416. Step S416 determines whether the first vertical bar is a component of an "L" character. If, in step S416, it is determined that the first vertical bar is a component of an "L" character, flow proceeds to step S417 where the vertical bars are cut at "cut 1" 94 shown in FIG. 9. "Cut 1" 94, is a cut located a predetermined distance from the second vertical bar and between the second vertical bar and a center point between the first and second vertical bars. After "cut 1" is made, flow proceeds to step S407 which stores the cut characters. If, however, step S416 determines that one of the vertical bars is not a component of an "L" character, then no cut is made, and flow proceeds to step S406 which detects a next vertical bar.

If the vertical bars are classified as class 2 in step S409, flow proceeds through step S410 to step S411 and then to step S418. Step S418 calculates the same distance "d", shown in FIG. 9, and compares the distance "d" to a minimum distance dmin, not shown in FIG. 9. Minimum distance dmin is a minimum distance between two vertical bars of two touching characters. If, in step S418, it is determined that "d" is less than dmin, then no cut is made because "d" being less than dmin indicates that the two vertical bars are part of a same character, and therefore flow proceeds to step S406 which detects a next vertical bar. If, however, step S418 determines that "d" is not less than dmin, then flow proceeds to step S419 which determines if the vertical bars are components of either an "R" character or an "A" character. If step S419 determines that the vertical bars are components of either an "R" character or an "A" character, then no cut is made and flow proceeds to step S406 which detects a next vertical bar. If, however, step S419 determines that the vertical bars are not components of either an "R" or an "A" character, then flow proceeds to step S420 where a "cut 1" is made. After the "cut 1" is made, flow proceeds to step S407 which stores the cut characters.

If the vertical bars are classified as class 3 in step S409, flow proceeds through steps S410 and S411 to step S412. In this case, no cut is made and flow proceeds directly from step S412 to step S406 which detects a next vertical bar.

If the vertical bars are classified as class 4 in step S409, flow proceeds through steps S410, S411, and S412 to step S413 and then to step S421. Step S421 calculates the same distance "d", shown in FIG. 9, and compares the distance to a sum of maximum distance dmax and an offset constant, not shown in FIG. 9. The offset constant is a preset constant which is based on an average height of characters in the input image data, and which is included to compensate for changes in character length due to changes in character font. Typically, the offset constant is set to one-ninth of an average character height. If step S421 determines that "d" is not greater than dmax plus the offset constant, then a "cut 0" is made, after which flow proceeds to step S407 which stores the cut characters. If, however, step S421 determines that "d" is greater than dmax plus an offset constant, then no cut is made and flow proceeds to step S406 which detects a next vertical bar.

In the cases described above where no cut is made and a next vertical bar is detected, the process is repeated for next pairs of vertical bars until a cut is made or until a next vertical bar is not detected.

The above method, applied to specific examples of touching characters in each of the four classifications discussed above, is described below.

Class 1

Figure 10A:
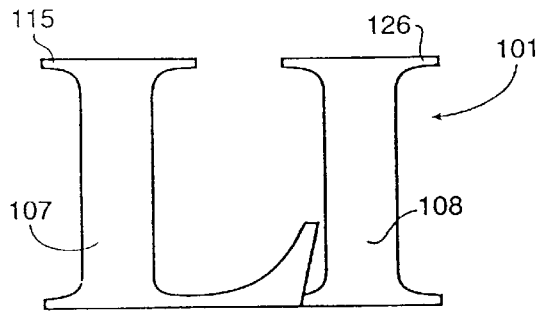
FIGS. 10(a), 10(b), 10(c), 10(d), and 10(e) show an example of a class 1 vertical bar combination and pictorially represent cutting characters using the character cutting technique of the present invention.

FIG. 10(a) shows a touching (or "merged") "LI" character combination, comprised of "L" character 115 and "I" character 126, found in a text region of image data. According to the present invention, as described by the flow diagrams shown in FIGS. 3 and 4, the image data containing the "LI" character combination is input into the optical character recognition system in step S301. Step S302 identifies text blocks in the input image data, and step S303 identifies lines of text in the text blocks. Steps S301, S302, and S303 are described in detail above.

Step S304 cuts character areas in the lines of text according to the white space cutting method described above. Since there is no white space between "L" character 115 and "I" character 126 in the "LI" character combination, "L" 115 and "I" 126 are not cut in step S304. Step S305 determines whether any cut characters remain for processing. In this case, the "LI" character combination has not been processed. Therefore, flow proceeds to step S306 which initializes a flag. Flow then proceeds to step S307. Step S307 recognizes the cut character areas; however, since the "LI" character combination is not a standard character, it cannot be recognized. Flow then proceeds to step S308 where the failure to recognize the "LI" character combination is confirmed. Next, since the "LI" character combination was not recognized, flow proceeds from step S309 to step S310. Step S310 determines whether the "LI" character combination has been cut and recognized ten times. If this is the case, flow proceeds to step S321 which stores an error flag. If, however, the "LI" character combination has not been cut and recognized ten times, flow proceeds to step S311 where the "LI" character combination is cut by the character cutting method of the present invention, as shown in FIG. 4.

Figure 10B:
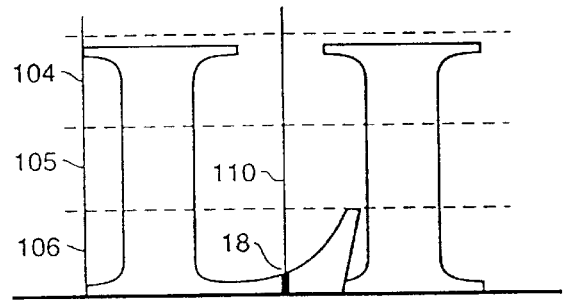

Step S401 determines the location of lines 1, 2, 3 and 4, as shown in FIG. 6. Step S402 locates and selects character areas which extend only between lines 1 and 3. This includes the "LI" character combination, which is therefore selected for further processing. Step S403 calculates a vertical histogram 103 of the "LI" character combination, shown in FIG. 10(d). Step S404 sets a predetermined vertical component for detecting vertical bars in the vertical histogram, labelled "h" 102 in FIG. 10(d). Flow then proceeds to step S405 which detects vertical bar 107 in vertical histogram 103 that exceeds the predetermined vertical component "h" 102. Step S406 detects next vertical bar 108 in vertical histogram 103 that exceeds the predetermined vertical component "h" 102. Step S430 determines whether a next vertical bar was detected in step S406. In this case, next vertical bar 108 was detected, therefore, flow proceeds to step S408. Step S408 detects horizontal crossings across vertical line 110 at point "x" 109 in each of three discrete horizontal bands 104, 105, and 106 located between vertical bars 107 and 108, as shown in FIG. 10(b). In this case, i.e., the "LI" character combination, horizontal crossing 18, shown in FIG. 10(b), is detected in first horizontal band 106.

However, no horizontal crossing is detected in second horizontal band 105 or in third horizontal band 104. Flow then proceeds to step S409 which classifies vertical bars 107 and 108 according to the classification system shown in FIG. 8.

Figure 10C:
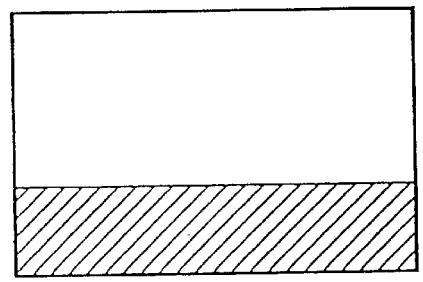
Figure 10D:
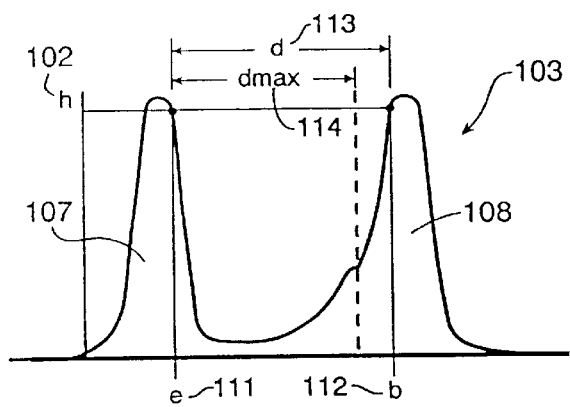

In this case, the vertical bars have a horizontal crossing 18 located in first horizontal band 106. Therefore, this case has a classification box, as shown in FIG. 10(c), which matches classification box 83, shown in FIG. 8. Thus, vertical bars 107 and 108 are classified as class 1 vertical bars.

Once vertical bars 107 and 108 have been classified in step S409, flow proceeds to step S410 which determines whether the vertical bars are classified as class 1 vertical bars. In this case, as determined in step S409, vertical bars 107 and 108 are classified as class 1 vertical bars. Therefore, flow proceeds to step S414.

Figure 10E:
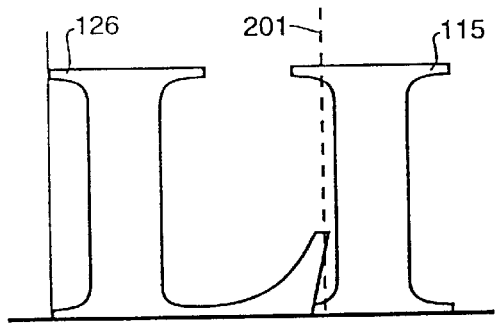

First, referring to FIG. 10(d), step S414 calculates a distance between endpoint "e" 111 of vertical bar 107 and beginning point "b" 112 of vertical bar 108, labelled "d" 113, and compares the calculated distance to maximum character distance dmax 114. In this case, as shown in FIG. 10(d), "d" 113 is greater than dmax 114. Therefore, flow proceeds from step S414 to step S416 which determines if vertical bar 107 is a component of an "L" character. In this case, vertical bar 107 is a component of "L" character 115. Therefore, flow proceeds from step S416 to step S417 where vertical bars 107 and 108, representing "L" character 115 and "I" character 126 respectively, are cut at "cut 1" 201, as shown in FIG. 10(e). After the vertical bars are cut, flow proceeds to step S407 where the cut characters are stored.

After cutting the "LI" character combination in step S311 using the character cutting method of the present invention, flow proceeds to step S312 which determines whether a cut was made. In this case, a cut was made, so flow proceeds to step S318 which increments the flag by one to indicate that the "LI" character combination has been cut by one of the cutting methods in steps S311, S313, S315, or S317. Next, step S307 recognizes the cut "L" and "I" characters, and step S308 checks the results of the recognition in step S307. If the "L" and "I" characters have been properly cut and recognized, flow proceeds from step S309 to step S320 which stores the recognized characters. If, however, the "L" and "I" characters have not been properly cut and recognized, the entire process, i.e., steps S307 to S318, is repeated. The process of the present invention can be performed for one touching character combination a total of ten times, after which flow proceeds from step S310 to step S321 which stores an error flag.

Class 2

FIG. 12(a) shows an "FN" touching character combination found in image data input into an optical character recognition system of the present invention. In this case, steps S301 to S310 are the same as in the case of the "LI" touching character combination described above, and, therefore, the details thereof are omitted here. Following steps S301 to S310, in step S311 the "FN" touching character combination is cut according to the character cutting method of the present invention.

FIG. 4 shows the character cutting method of the present invention. First, steps S401 and S402 select the "FN" touching character combination. The selection details are the same as those described above with respect to the "LI" touching character combination, and, therefore, are omitted here. Next step S403 calculates vertical histogram 172 of the "FN" touching character combination, shown in FIG. 12(c) and step S404 sets a predetermined vertical component "h" 102. Step S405 detects vertical bar 139 in vertical histogram 172, and step S406 detects next vertical bar 140 in vertical histogram 172. As was the case with respect to the "LI" touching character combination, both vertical bars 139 and 140 exceed predetermined vertical component "h" 102. Flow then proceeds from step S430 to step S408 which detects horizontal crossings at line 173 in each of three horizontal bands 155, 156, and 157 located between vertical bars 139 and 140. Horizontal crossing 159 is detected in second horizontal band 156, and horizontal crossing 160 is detected in third horizontal band 157. No horizontal crossing is detected in first horizontal band 155. Thus, vertical bars 139 and 140 have horizontal crossings that match classification box 84, shown in FIG. 8 and in FIG. 12(b). Therefore, vertical bars 139 and 140 are classified as class 2 vertical bars.

Once vertical bars 139 and 140 have been classified in step S409, flow proceeds through step S410 to step S411 which determines whether the vertical bars are classified as class 2 vertical bars. In this case, as determined in step S409, vertical bars 139 and 140 are classified as class 2 vertical bars. Therefore flow proceeds to step S418.

Referring to FIG. 12(c), step S418 calculates a distance "d" 160 between endpoint "e" 170 of vertical bar 139 and beginning point "b" 171 of vertical bar 140, and compares the calculated distance to a minimum character distance dmin 161. In this case, "d" 160 is not less than dmin 161. Therefore, flow proceeds to step S419 which determines if vertical bar 139 and vertical bar 140 are components of either an "R" character or an "A" character. In this case, vertical bars 139 and 140 are components of an "FN" character combination, and not components of an "R" character or an "A" character. Therefore, flow proceeds to step S420 where "cut 1" 202, shown in FIG. 12(a), is made. Flow then proceeds to step S407 which stores the cut characters.

After the character cutting method of the present invention described above is completed, flow proceeds from step S311 to step S312. The remainder of the recognition process for the "FN" character combination is the same as the recognition process for the "LI" character combination, and, therefore, a discussion thereof is omitted here.

Class 3

Figure 11A:
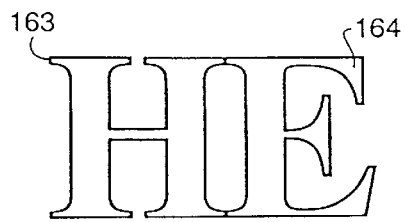
FIGS. 11(a), 11(b), 11(c), 11(d), 11(e), 11(f), and 11(g) show examples of class 3 and class 1 vertical bar combinations and pictorially represent both cutting and not cutting characters using the character cutting technique of the present invention.

FIG. 11(a) shows an "HE" touching character combination found in image data input into the optical character recognition system of the present invention. In this case, steps S301 to S310 of the present invention are the same as in the case of the "LI" touching character combination described above, and, therefore, details thereof are omitted here. Following steps S301 to S310, in step S311 the "HE" touching character combination is cut according to the character cutting method of the present invention, as shown in FIG. 4.

Figure 11B:
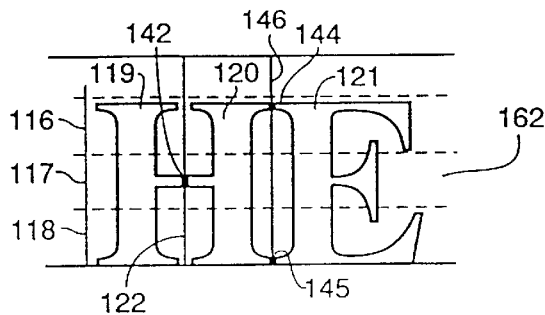
Figure 11C:
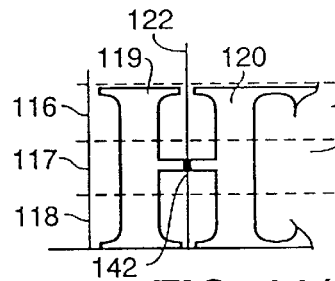
Figure 11D:
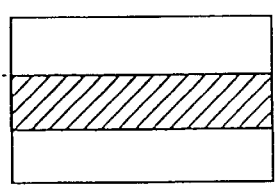

Steps S401 and S402 select the "HE" touching character combination. The selection details are the same as those described above with respect to the "LI" touching character combination, and, therefore, are omitted here. Step S403 calculates a vertical histogram (not shown) of the "HE" touching character combination, and step S404 sets a predetermined vertical component. Step S405 detects vertical bar 119 in the vertical histogram, and step S406 detects next vertical bar 120 in the vertical histogram. Flow then proceeds from step S430 to step S408 which detects horizontal crossings at line 122 in each of three discrete horizontal bands 116, 117, and 118 located between vertical bars 119 and 120, as shown in FIG. 11(b). Since vertical bars 119 and 120 represent components of "H" character 163, shown in FIG. 11(c), the character cutting method of the present invention is first concerned with whether "H"character 163 should be cut. In step S408, only horizontal crossing 142 at line 122 is detected. Horizontal crossing 142 is detected in second horizontal band 117, as shown in FIGS. 11(b) and 11(c). No horizontal crossing is detected in first horizontal band 118 or in third horizontal band 116. Thus, with reference to "H" character 163, vertical bars 119 and 120 have a horizontal crossing that matches classification box 86 shown in FIG. 8 and in FIG. 11(d). Therefore, vertical bars 119 and 120 are classified as class 3 vertical bars.

In this case, as determined in step S409, vertical bars 119 and 120 are classified as class 3 vertical bars. Therefore, no cut is made and flow proceeds through steps S410 and S411 to step S412 and directly to step S406 which detects a next vertical bar.

Figure 11E:
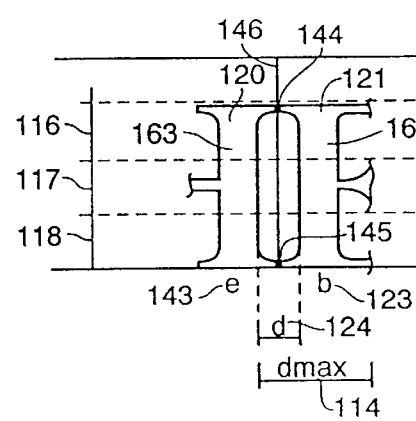
Figure 11F:
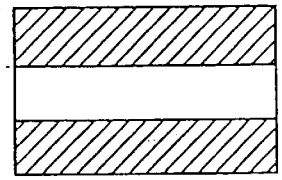

In this case, step S406 detects next vertical bar 121, shown in FIGS. 11(b) and 11(e). Therefore, flow proceeds from step S430 to step S408 which detects horizontal crossings at line 146 in each of three horizontal bands 116, 117, and 118 located between vertical bars 120 and 121. In this case, i.e., the touching area between "H" character 163 and "E" character 164 shown in FIG. 11(e), horizontal crossing 144 is detected in third horizontal band 116 and horizontal crossing 145 is detected in first horizontal band 118. No horizontal crossing is detected in second horizontal band 117. Therefore, the "HE" touching character combination, shown in FIG. 11(e), has horizontal crossings that match classification box 81 shown in FIG. 8 and in FIG. 11(f). So, in step S409, vertical bars 120 and 121 are classified as class 1 vertical bars.

In this case, as determined in step S409, vertical bars 120 and 121 are classified as class 1 vertical bars. Therefore, flow proceeds from step S409 to step S410 to step S414.

Figure 11G:
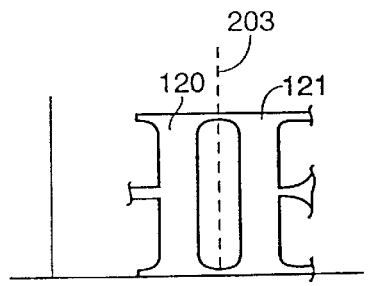

First, referring to FIG. 11(e), step S414 calculates a distance (calculated on the histogram but shown on the characters) between endpoint "e" 143 of vertical bar 120 and beginning point "b" 123 of vertical bar 121, labelled "d" 124, and compares the calculated distance to a maximum character distance dmax 114. In this case, as shown in FIG. 11(e), "d" 124 is not greater than dmax 114. Therefore, flow proceeds from step S414 to step S415 where a "cut 0" 203 (along line 146) is made, as shown in FIG. 11(g). After the cut is made, flow proceeds to step S407 which stores the cut characters.

After the character cutting method of the present invention is completed, flow proceeds from step S311 to step S312. The remainder of the recognition process for the "HE" touching character combination is the same as the recognition process for the "LI" character combination, and, therefore, details thereof are omitted here.

Class 4

FIG. 5(a) shows "UM" touching character combination 165 found in image data input into the optical character recognition system of the present invention. In this case, steps S301 to S310 of the present invention are the same as in the case of the "LI" touching character combination described above, and, therefore, details thereof are omitted here. Following steps S301 to S310, step S311 cuts the "UM" touching character combination according to the character cutting method of the present invention, as shown in FIG. 4.

Steps S401 and S402 select the "UM" touching character combination. The selection details are the same as those described above with respect to the "LI" touching character combination, and, therefore, are omitted here. Next, step S403 calculates a vertical histogram (not shown) of the "UM" touching character combination, and step S404 sets a predetermined vertical component. Step S405 detects vertical bar 125 in the vertical histogram, and step S406 detects next vertical bar 130 in the vertical histogram. Flow then proceeds from step S430 to step S408 which detects horizontal crossings at line 150 in each of three horizontal bands 147, 148, and 149 located between vertical bars 125 and 130. Since vertical bars 125 and 130 represent components of "U" character 166, shown in FIG. 5(b), the character cutting method of the present invention is first concerned with whether "U" character 166 should be cut. Thus, step S408 detects only horizontal crossing 151 at line 150 which is located in first horizontal band 147. No horizontal crossing is detected in second horizontal band 148 or in third horizontal band 149. Thus, with reference to "U" character 166, vertical bars 125 and 130 have a horizontal crossing that matches classification box 83 shown in FIG. 8 and in FIG. 5(c). Therefore, vertical bars 125 and 130 are classified as class 1 vertical bars.

In this case, as determined in step S409, vertical bars 125 and 130 are classified as class 1 vertical bars. Therefore, flow proceeds from step S410 to step S414.

First, referring to FIG. 5(b), step S414 calculates a distance (calculated on the histogram but shown on the characters) between endpoint "e" 132 of vertical bar 125 and beginning point "b" 133 of vertical bar 130, labelled "d" 134, and compares the calculated distance to maximum character distance dmax 114. In this case, as shown in FIG. 5(b), "d" 134 is greater than dmax 114. Therefore, flow proceeds from step S414 to step S416 which determines whether vertical bar 125 is a component of an "L" character. In this case, vertical bar 125 is not a component of an "L" character. Therefore, no cut is made, and flow proceeds to step S406 which detects a next vertical bar.

In this case, step S406 detects next vertical bar 131. Therefore, flow proceeds from step S430 to step S408 which detects horizontal crossings at line 153 in each of three horizontal bands 147, 148, and 149 located between vertical bars 130 and 131, as shown in FIGS. 5(a) and 5(d). In this case, i.e., the touching area between "U" character 166 and "M" character 167, shown in FIG. 5(d), horizontal crossing 154 is detected in third horizontal band 149, and no horizontal crossings are detected in first horizontal band 147 or in second horizontal band 148. Therefore, the "UM" touching character combination, shown in FIG. 5(d), has a horizontal crossing that matches classification box 88 shown in FIG. 8 and in FIG. 5(e). Therefore, step S409 classifies vertical bars 130 and 131 as class 4 vertical bars.

In this case, as determined in step S409, vertical bars 130 and 131 are classified as class 4 vertical bars. Therefore, flow proceeds through steps S410, S411, and S412 to step S413 and then to step S421.

First, referring to FIG. 5(d), step S421 calculates a distance (calculated on the histogram but shown on the characters) between endpoint "e" 135 of vertical bar 130 and beginning point "b" 136 of vertical bar 131, labelled "d" 137, and compares the calculated distance to a sum of maximum character distance dmax 114 and an offset constant. In this case, as shown in FIG. 5(d), "d" 137 is not greater than dmax 114 plus the offset constant. Therefore, flow proceeds from step S421 to step S422 where a "cut 0" 204, as shown in FIG. 5(f), is made. After the cut is made, flow proceeds to step S407 which stores the cut characters.

After the character cutting method of the present invention described above is completed in step S311, the recognition process proceeds from step S311 to step S312. The remainder of the recognition process for the "UM" touching character combination is the same as the recognition process for the "LI" character combination, and, therefore, is omitted here.

The above examples represent only a few touching character combinations that can be cut and recognized by the present invention. As discussed above, the present invention can be applied to any upper-case touching character combination, regardless of the type of character or font.

What is claimed is:

1. A method for cutting individual characters out of character image data which includes at least two touching characters, said method comprising the steps of:

detecting a first pair of vertical bars in the character image data;

checking for a presence of image data in each of plural discrete horizontal bands located between the first pair of vertical bars;

classifying the first pair of vertical bars into one of plural classes based on which of the plural discrete horizontal bands contain image data;

measuring a distance between the first pair of vertical bars;

comparing the distance between the first pair of vertical bars to one of plural predetermined distances, the one of the plural predetermined distances corresponding to the class into which the first pair of vertical bars has been classified; and determining whether and where to cut between the first pair of vertical bars based on at least one of the classification and the comparison between the first pair of vertical bars and the one of the plural predetermined distances, wherein, for all classifications of the first pair of vertical bars, when it is determined to cut, the determining step determines to cut at one of only two locations between the first pair of vertical bars.

2. A method according to claim 1, further comprising the step of generating a vertical histogram of the character image data, and wherein the detecting step includes detecting the first pair of vertical bars in the vertical histogram.

3. A method according the claim 2, further comprising the step of storing a predetermined vertical threshold, and wherein the detecting step includes detecting a first pair of vertical bars comprised of two vertical bars each having a vertical component that exceeds the predetermined vertical threshold.

4. A method according to claim 1, wherein the checking step includes checking for the presence of image data by checking for horizontal crossings on a vertical line located between the first pair of vertical bars and passing through each horizontal band.

5. A method according to claim 4, wherein the vertical line is located at a center point between the first pair of vertical bars.

6. A method according to claim 1, wherein the checking step includes checking for the presence of image data in each of three discrete horizontal bands.

7. A method according to claim 1, further comprising the step of selecting character image data for character cutting which extends between a predetermined character baseline and a predetermined character maximum height line.

8. A method according to claim 1, wherein each plural discrete horizontal band has a same height.

9. A method according to claim 1, wherein the classifying step includes classifying the first pair of vertical bars into one of four classes of vertical bars, and wherein the checking step includes checking for the presence of image data in each of three discrete horizontal bands.

10. A method according to claim 9, wherein the four classes of vertical bars include (i) a first class of vertical bars in which (a) image data is present in only both a first horizontal band and a third horizontal band, (b) image data is present in only the first horizontal band, and (c) image data is absent from all three horizontal bands, (ii) a second class of vertical bars in which (a) image data is present in only both a second horizontal band and the third horizontal band, and (b) image data is present in all three horizontal bands, (iii) a third class of vertical bars in which (a) image data is present in only the second horizontal band, and (b) image data is present in only both the first horizontal band and the second horizontal band, and (iv) a fourth class of vertical bars in which image data is present in only the third horizontal band.

11. A method according to claim 10, further comprising the steps of:

cutting between the first pair of vertical bars when both a set of cutting conditions is satisfied and the first pair of vertical bars is classified as one of first class, second class, and fourth class; and detecting a next vertical bar when the first pair of vertical bars is classified as third class, and when both the set of cutting conditions is unsatisfied and the first pair of vertical bars is classified as one of first class, second class, and fourth class.

12. A method according to claim 11, wherein the set of cutting conditions relate to whether the distance between the first pair of vertical bars is greater than the one of the plural predetermined distances and whether the first pair of vertical bars represents a predetermined character.

13. A method according to claim 1, wherein the two points include a center point located an equal distance from each vertical bar in the first pair of vertical bars, and an offset point located between the center point and a second vertical bar in the first pair of vertical bars.

14. A method according to claim 1, further comprising the steps of:

storing the plural predetermined distances;

storing a plurality of preset characters; and deciding whether a portion of the first pair of vertical bars matches one of the preset characters;

wherein the determining step includes determining whether and where to cut between the first pair of vertical bars based additionally on whether a portion of the first pair of vertical bars matches one of the preset characters.

15. A method according to claim 1, further comprising the steps of:

detecting a next vertical bar when it is determined not to cut between the first pair of vertical bars; and repeating the method for a next pair of vertical bars.

16. An apparatus for cutting individual characters out of character image data which includes at least two touching characters, said apparatus comprising:

detecting means for detecting a first pair of vertical bars in the character image data;

checking means for checking for a presence of image data in each of plural discrete horizontal bands located between the first pair of vertical bars;

classifying means for classifying the first pair of vertical bars into one of plural classes based on which of the plural discrete horizontal bands contain image data;

measuring means for measuring a distance between the first pair of vertical bars;

comparing means for comparing the distance between the first pair of vertical bars to one of plural predetermined distances, the one of the plural predetermined distances corresponding to the class into which the first pair of vertical bars has been classified; and determining means for determining whether and where to cut between the first pair of vertical bars based on at least one of the classification and the comparison between the first pair of vertical bars and the one of the plural predetermined distances, wherein, for all classifications of the first pair of vertical bars, when it is determined to cut, the determining means determines to cut at one of only two locations between the first pair of vertical bars.

17. An apparatus according to claim 16, further comprising generating means for generating a vertical histogram of the character image data, and wherein the detecting means detects the first pair of vertical bars in the vertical histogram.

18. An apparatus according the claim 17, further comprising storing means-for storing a predetermined vertical threshold, and wherein the detecting means detects a first pair of vertical bars comprised of two vertical bars each having a vertical component that exceeds the predetermined vertical threshold.

19. An apparatus according to claim 16, wherein the checking means checks for the presence of image data by checking for horizontal crossings on a vertical line located between the first pair of vertical bars and passing through each horizontal band.

20. An apparatus according to claim 19, wherein the vertical line is located at a center point between the first pair of vertical bars.

21. An apparatus according to claim 16, wherein the checking means checks for a presence of image data in each of three discrete horizontal bands.

22. An apparatus according to claim 16, further comprising selecting means for selecting character image data for character cutting which extends between a predetermined character baseline and a predetermined character maximum height line.

23. An apparatus according to claim 16, wherein each plural discrete horizontal band has a same height.

24. An apparatus according to claim 16, wherein the classifying means classifies the first pair of vertical bars into one of four classes of vertical bars, and wherein the checking means checks for the presence of image data in each of three discrete horizontal bands.

25. An apparatus according to claim 24, wherein the four classes of vertical bars include (i) a first class of vertical bars in which (a) image data is present in only both a first horizontal band and a third horizontal band, (b) image data is present in only the first horizontal band, and (c) image data is absent from all three horizontal bands, (ii) a second class of vertical bars in which (a) image data is present in only both a second horizontal band and the third horizontal band, and (b) image data is present in all three horizontal bands, (iii) a third class of vertical bars in which (a) image data is present in only the second horizontal band, and (b) image data is present in only both the first horizontal band and the second horizontal band, and (iv) a fourth class of vertical bars in which image data is present in only the third horizontal band.

26. An apparatus according to claim 25, further comprising:

cutting means for cutting between the first pair of vertical bars when both a set of cutting conditions is satisfied and the first pair of vertical bars is classified as one of first class, second class, and fourth class; and next bar detecting means for detecting a next vertical bar when the first pair of vertical bars is classified as third class, and when both the set of cutting conditions is unsatisfied and the first pair of vertical bars is classified as one of first class, second class, and fourth class.

27. An apparatus according to claim 26, wherein the set of cutting conditions relate to whether the distance between the first pair of vertical bars is greater than the one of the plural predetermined distances and whether the first pair of vertical bars represents a predetermined character.

28. An apparatus according to claim 16, wherein the two points include a center point located an equal distance from each vertical bar in the first pair of vertical bars, and an offset point located between the center point and a second vertical bar in the first pair of vertical bars.

29. An apparatus according to claim 16, further comprising:

distance storing means for storing the plural predetermined distances;

character storing means for storing a plurality of preset characters; and character judging means for judging whether a portion of the first pair of vertical bars matches one of the preset characters;

wherein the determining means determines whether and where to cut between the first pair of vertical bars based additionally on the output of the character judging means.

30. An apparatus according to claim 16, further comprising:

next bar detecting means for detecting a next vertical bar when it is determined not to cut between the first pair of vertical bars.

31. An optical character recognition method for recognizing characters in input image data, comprising the steps of:

inputting image data including character image data which represents images of characters;

cutting character image data out of the image data;

performing optical character recognition processing on the cut character image data;

selecting unrecognized cut character image data;

detecting a first pair of vertical bars in the unrecognized cut character image data;

checking for a presence of character image data in each of plural discrete horizontal bands located between the first pair of vertical bars;

classifying the first pair of vertical bars into one of plural classes based on which of the plural discrete horizontal bands contain character image data;

measuring a distance between the first pair of vertical bars;

comparing the distance between the first pair of vertical bars to one of plural predetermined distances, the one of the plural predetermined distances corresponding to the class into which the first pair of vertical bars has been classified;

determining whether and where to cut between the first pair of vertical bars in the unrecognized cut character image data based on at least one of the classification and the comparison between the first pair of vertical bars and the one of the plural predetermined distances, wherein, for all classifications of the first pair of vertical bars, when it is determined to cut, the determining step determines to cut at one of only two locations between the first pair of vertical bars;

cutting between the first pair of vertical bars in the unrecognized character image data when it is determined to cut between the vertical bars;

performing optical character recognition processing on newly-cut character image data; and outputting recognized characters.

32. A method according to claim 31, further comprising the step of generating a vertical histogram of the unrecognized cut character image data, and wherein the detecting step includes detecting the first pair of vertical bars in the vertical histogram.

33. A method according the claim 32, further comprising the step of storing a predetermined vertical threshold, and wherein the detecting step includes detecting a first pair of vertical bars comprised of two vertical bars each having a vertical component that exceeds the predetermined vertical threshold.

34. A method according to claim 31, wherein the checking step includes checking for the presence of image data by checking for horizontal crossings on a vertical line located between the first pair of vertical bars and passing through each horizontal band.

35. A method according to claim 34, wherein the vertical line is located at a center point between the first pair of vertical bars.

36. A method according to claim 31, wherein the checking step includes checking for a presence of image data in each of three discrete horizontal bands.

37. A method according to claim 31, wherein the selecting step includes selecting unrecognized cut character image data for character cutting which extends between a predetermined character baseline and a predetermined character maximum height line.

38. A method according to claim 31, wherein each plural discrete horizontal band has a same height.

39. A method according to claim 31, wherein the classifying step includes classifying the first pair of vertical bars into one of four classes of vertical bars, and wherein the checking step includes checking for the presence of image data in each of three discrete horizontal bands.

40. A method according to claim 39, wherein the four classes of vertical bars include (i) a first class of vertical bars in which (a) image data is present in only both a first horizontal band and a third horizontal band, (b) image data is present in only the first horizontal band, and (c) image data is absent from all three horizontal bands, (ii) a second class of vertical bars in which (a) image data is present in only both a second horizontal band and the third horizontal band, and (b) image data is present in all three horizontal bands, (iii) a third class of vertical bars in which (a) image data is present in only the second horizontal band, and (b) image data is present in only both the first horizontal band and the second horizontal band, and (iv) a fourth class of vertical bars in which image data is present in only the third horizontal band.

41. A method according to claim 40, further comprising the step of:

detecting a next vertical bar when the first pair of vertical bars is classified as third class, and when both a set of cutting conditions is unsatisfied and the first pair of vertical bars is classified as one of first class, second class, and fourth class, and wherein the step of cutting between the first pair of vertical bars includes cutting between the first pair of vertical bars when both the set of cutting conditions is satisfied and the first pair of vertical bars is classified as one of first class, second class, and fourth class.

42. A method according to claim 41, wherein the set of cutting conditions relate to whether the distance between the first pair of vertical bars is greater than the one of the plural predetermined distances and whether the first pair of vertical bars represents a predetermined character.

43. A method according to claim 31, wherein the two points include a center point located an equal distance from each vertical bar in the first pair of vertical bars, and an offset point located between the center point and a second vertical bar in the first pair of vertical bars.

44. A method according to claim 31, further comprising the steps of:

storing the plural predetermined distances;

storing a plurality of preset characters; and deciding whether a portion of the first pair of vertical bars matches one of the preset characters;

wherein the determining step includes determining whether and where to cut between the first pair of vertical bars based additionally on whether a portion of the first pair of vertical bars matches one of the preset characters.

45. A method according to claim 31, further comprising the steps of:

detecting a next vertical bar when it is determined not to cut between the first pair of vertical bars; and repeating the method for a next pair of vertical bars.

46. An optical character recognition apparatus for recognizing characters in input image data, comprising:

inputting means for inputting image data including character image data which represents images of characters;

cutting means for cutting character image data in the image data;

optical character recognition processing means for performing optical character recognition processing on the cut character image data;

selecting means for selecting unrecognized cut character image data;

detecting means for detecting a first pair of vertical bars in the unrecognized cut character image data;

checking means for checking for a presence of character image data in each of plural discrete horizontal bands located between the first pair of vertical bars;

classifying means for classifying the first pair of vertical bars into one of plural classes based on which of the plural discrete horizontal bands contain character image data;

measuring means for measuring a distance between the first pair of vertical bars;

comparing means for comparing the distance between the first pair of vertical bars to one of plural predetermined distances, the one of the plural predetermined distances corresponding to the class into which the first pair of vertical bars has been classified;

determining means for determining whether and where to cut between the first pair of vertical bars in the unrecognized cut character image data based on at least one of the classification and the comparison between the first pair of vertical bars and the one of the plural predetermined distances, wherein, for all classifications of the first pair of vertical bars, when it is determined to cut, the determining means determines to cut at one of only two locations between the first pair of vertical bars;

bar cutting means for cutting between the first pair of vertical bars in the unrecognized character image data when it is determined to cut between the first pair of vertical bars;

optical character recognition processing means for performing optical character recognition processing on newly-cut character image data; and outputting means for outputting recognized characters.

47. An apparatus according to claim 46, further comprising generating means for generating a vertical histogram of the unrecognized cut character image data, and wherein the detecting means detects the first pair of vertical bars in the vertical histogram.

48. An apparatus according the claim 47, further comprising storing means for storing a predetermined vertical threshold, and wherein the detecting means detects a first pair of vertical bars comprised of two vertical bars each having a vertical component that exceeds the predetermined vertical threshold.

49. An apparatus according to claim 46, wherein the checking means checks for the presence of image data by checking for horizontal crossings on a vertical line located between the first pair of vertical bars and passing through each horizontal band.

50. An apparatus according to claim 49, wherein the vertical line is located at a center point between the first pair of vertical bars.

51. An apparatus according to claim 46, wherein the checking means checks for the presence of image data in each of three discrete horizontal bands.

52. An apparatus according to claim 46, wherein the selecting means selects unrecognized cut character image data for character cutting which extends between a predetermined character baseline and a predetermined character maximum height line.

53. An apparatus according to claim 46, wherein each plural discrete horizontal band has a same height.

54. An apparatus according to claim 46, wherein the classifying means classifies the first pair of vertical bars into one of four classes of vertical bars, and wherein the checking means checks for the presence of image data in each of three discrete horizontal bands.

55. An apparatus according to claim 54, wherein the four classes of vertical bars include
(i) a first class of vertical bars in which (a) image data is present in only both a first horizontal band and a third horizontal band, (b) image data is present in only the first horizontal band, and (c) image data is absent from all three horizontal bands,
(ii) a second class of vertical bars in which (a) image data is present in only both a second horizontal band and the third horizontal band, and (b) image data is present in all three horizontal bands,
(iii) a third class of vertical bars in which (a) image data is present in only the second horizontal band, and (b) image data is present in only both the first horizontal band and the second horizontal band, and
(iv) a fourth class of vertical bars in which image data is present in only the third horizontal band.

56. An apparatus according to claim 55, further comprising:
next bar detecting means for detecting a next vertical bar when the first pair of vertical bars is classified as third class, and when both a set of cutting conditions is unsatisfied and the first pair of vertical bars is classified as one of first class, second class, and fourth class, and wherein the bar cutting means cuts between the first pair of vertical bars when both the set of cutting conditions is satisfied and the first pair of vertical bars is classified as one of first class, second class, and fourth class.

57. An apparatus according to claim 56, wherein the set of cutting conditions relate to whether the distance between the first pair of vertical bars is greater than the one of the plural predetermined distances and whether the first pair of vertical bars represents a predetermined character.

58. An apparatus according to claim 46, wherein the two points include a center point located an equal distance from each vertical bar in the first pair of vertical bars, and an offset point located between the center point and a second vertical bar in the first pair of vertical bars.

59. An apparatus according to claim 46, further comprising:
distance storing means for storing the plural predetermined distances;
character storing means for storing a plurality of preset characters; and
character judging means for judging whether a portion of the first pair of vertical bars matches one of the preset characters;
wherein the determining means determines whether and where to cut between the first pair of vertical bars based additionally on the output of the character judging means.

60. An apparatus according to claim 46, further comprising:
next bar detecting means for detecting a next vertical bar when it is determined not to cut between the first pair of vertical bars.

61. Computer-executable process steps stored in a computer-readable medium, the computer-executable process steps to cut individual characters out of character image data which includes at least two touching characters, the computer-executable process steps comprising:
code to detect a first pair of vertical bars in the character image data;
code to check for a presence of image data in each of plural discrete horizontal bands located between the first pair of vertical bars;
code to classify the first pair of vertical bars into one of plural classes based on which of the plural discrete horizontal bands contain image data;
code to measure a distance between the first pair of vertical bars;
code to compare the distance between the first pair of vertical bars to one of plural predetermined distances, the one of the plural predetermined distances corresponding to the class into which the first pair of vertical bars has been classified; and
code to determine whether and where to cut between the first pair of vertical bars based on at least one of the classification and the comparison between the first pair of vertical bars and the one of the plural predetermined distances, wherein, for all classifications of the first Pair of vertical bars, when it is determined to cut, the code to determine determines to cut at one of only two locations between the first pair of vertical bars.

62. Computer-executable process steps according to claim 61, further comprising code to generate a vertical histogram of the character image data, and wherein the code to detect detects the first pair of vertical bars in the vertical histogram.

63. Computer-executable process steps according the claim 62, further comprising code to store a predetermined vertical threshold, and wherein the code to detect detects a first pair of vertical bars comprised of two vertical bars each having a vertical component that exceeds the predetermined vertical threshold.

64. Computer-executable process steps according to claim 61, wherein the code to check checks for the presence of image data by checking for horizontal crossings on a vertical line located between the first pair of vertical bars and passing through each horizontal band.

65. Computer-executable process steps according to claim 64, wherein the vertical line is located at a center point between the first pair of vertical bars.

66. Computer-executable process steps according to claim 61, wherein the code to check checks for the presence of image data in each of three discrete horizontal bands.

67. Computer-executable process steps according to claim 61, further comprising code to select character image data for character cutting which extends between a predetermined character baseline and a predetermined character maximum height line.

68. Computer-executable process steps according to claim 61, wherein each plural discrete horizontal band has a same height.

69. Computer-executable process steps according to claim 61, wherein the code to classify classifies the first pair of vertical bars into one of four classes of vertical bars, and wherein the code to check checks for the presence of image data in each of three discrete horizontal bands.

70. Computer-executable process steps according to claim 69, wherein the four classes of vertical bars include
  (i) a first class of vertical bars in which (a) image data is present in only both a first horizontal band and a third horizontal band, (b) image data is present in only the first horizontal band, and (c) image data is absent from all three horizontal bands,
  (ii) a second class of vertical bars in which (a) image data is present in only both a second horizontal band and the third horizontal band, and (b) image data is present in all three horizontal bands,
  (iii) a third class of vertical bars in which (a) image data is present in only the second horizontal band, and (b) image data is present in only both the first horizontal band and the second horizontal band, and
  (iv) a fourth class of vertical bars in which image data is present in only the third horizontal band.

71. Computer-executable process steps according to claim 70, further comprising:
  code to cut between the first pair of vertical bars when both a set of cutting conditions is satisfied and the first pair of vertical bars is classified as one of first class, second class, and fourth class; and
  code to detect a next vertical bar when the first pair of vertical bars is classified as third class, and when both the set of cutting conditions is unsatisfied and the first pair of vertical bars is classified as one of first class, second class, and fourth class.

72. Computer-executable process steps according to claim 71, wherein the set of cutting conditions relates to whether the distance between the first pair of vertical bars is greater than one of plural predetermined distances and whether the first pair of vertical bars represents a predetermined character.

73. Computer-executable process steps according to claim 61, wherein the two points include a center point located an equal distance from each vertical bar in the first pair of vertical bars, and an offset point located between the center point and a second vertical bar in the first pair of vertical bars.

74. Computer-executable process steps according to claim 61, further comprising:
  code to store the plural predetermined distances;
  code to store a plurality of preset characters; and
  code to decide whether a portion of the first pair of vertical bars matches one of the preset characters;
  wherein the code to determine determines whether and where to cut between the first pair of vertical bars based additionally on whether a portion of the first pair of vertical bars matches one of the preset characters.

75. Computer-executable process steps according to claim 61, further comprising:
  code to detect a next vertical bar when it is determined not to cut between the first pair of vertical bars; and
  code to re-execute the process steps for a next pair of vertical bars.

76. Computer-executable process steps stored in a computer-readable medium, the computer-executable process steps comprising an optical character recognition method to recognize characters in input image data, the computer-executable process steps comprising:
  code to input image data including character image data which represents images of characters;
  code to cut character image data out of the image data;
  code to perform optical character recognition processing on the cut character image data;
  code to select unrecognized cut character image data;
  code to detect a first pair of vertical bars in the unrecognized cut character image data;
  code to check for a presence of character image data in each of plural discrete horizontal bands located between the first pair of vertical bars;
  code to classify the first pair of vertical bars into one of plural classes based on which of the plural discrete horizontal bands contain character image data;
  code to measure a distance between the first pair of vertical bars;
  code to compare the distance between the first pair of vertical bars to one of plural predetermined distances, the one of the plural predetermined distances corresponding to the class into which the first pair of vertical bars has been classified;
  code to determine whether and where to cut between the first pair of vertical bars in the unrecognized cut character image data based on at least one of the classification and the comparison between the first pair of vertical bars and the one of the plural predetermined distances, wherein, for all classifications of the first pair of vertical bars, the code to determine determines to cut at one of only two locations between the first pair of vertical bars;
  code to cut between the first pair of vertical bars in the unrecognized character image data when it is determined to cut between the vertical bars;

code to perform optical character recognition processing on newly-cut character image data; and code to output recognized characters.

77. Computer-executable process steps according to claim 76, further comprising code to generate a vertical histogram of the unrecognized cut character image data, and wherein the code to detect detects the first pair of vertical bars in the vertical histogram.

78. Computer-executable process steps according the claim 77, further comprising code to store a predetermined vertical threshold, and wherein the code to detect detects a first pair of vertical bars comprised of two vertical bars each having a vertical component that exceeds the predetermined vertical threshold.

79. Computer-executable process steps according to claim 76, wherein the code to check checks for the presence of image data by checking for horizontal crossings on a vertical line located between the first pair of vertical bars and passing through each horizontal band.

80. Computer-executable process steps according to claim 79, wherein the vertical line is located at a center point between the first pair of vertical bars.

81. Computer-executable process steps according to claim 76, wherein code to check checks for a presence of image data in each of three discrete horizontal bands.

82. Computer-executable process steps according to claim 76, wherein the code to select selects unrecognized cut character image data for character cutting which extends between a predetermined character baseline and a predetermined character maximum height line.

83. Computer-executable process steps according to claim 76, wherein each plural discrete horizontal band has a same height.

84. Computer-executable process steps according to claim 76, wherein the code to classify classifies the first pair of vertical bars into one of four classes of vertical bars, and wherein the code to check checks for the presence of image data in each of three discrete horizontal bands.

85. Computer-executable process steps according to claim 84, wherein the four classes of vertical bars include (i) a first class of vertical bars in which (a) image data is present in only both a first horizontal band and a third horizontal band, (b) image data is present in only the first horizontal band, and (c) image data is absent from all three horizontal bands, (ii) a second class of vertical bars in which (a) image data is present in only both a second horizontal band and the third horizontal band, and (b) image data is present in all three horizontal bands, (iii) a third class of vertical bars in which (a) image data is present in only the second horizontal band, and (b) image data is present in only both the first horizontal band and the second horizontal band, and (iv) a fourth class of vertical bars in which image data is present in only the third horizontal band.

86. Computer-executable process steps according to claim 85, further comprising:

code to detect a next vertical bar when the first pair of vertical bars is classified as third class, and when both a set of cutting conditions is unsatisfied and the first pair of vertical bars is classified as one of first class, second class, and fourth class, and wherein the code to cut cuts between the first pair of vertical bars when both the set of cutting conditions is satisfied and the first pair of vertical bars is classified as one of first class, second class, and fourth class.

87. Computer-executable process steps according to claim 86, wherein the set of cutting conditions relates to whether the distance between the first pair of vertical bars is greater than the one of the plural predetermined distances and whether the first pair of vertical bars represents a predetermined character.

88. Computer-executable process steps according to claim 76, wherein the two points include a center point located an equal distance from each vertical bar in the first pair of vertical bars, and an offset point located between the center point and a second vertical bar in the first pair of vertical bars.

89. Computer-executable process steps according to claim 76, further comprising:

code to store a plurality of predetermined distance conditions;

code to store a plurality of preset characters; and code to decide whether a portion of the first pair of vertical bars matches one of the preset characters;

wherein the code to determine determines whether and where to cut between the first pair of vertical bars based additionally on whether a portion of the first pair of vertical bars matches one of the preset characters.

90. Computer-executable process steps according to claim 76, further comprising:

code to detect a next vertical bar when it is determined not to cut between the first pair of vertical bars; and code to re-execute the process steps for a next pair of vertical bars.

91. A computer-readable memory medium which stores computer-executable process steps to cut individual characters out of character image data which includes at least two touching characters, the computer-executable process steps comprising:

a detecting step to detect a first pair of vertical bars in the character image data;

a checking step to check for a presence of image data in each of plural discrete horizontal bands located between the first pair of vertical bars;

a classifying step to classify the first pair of vertical bars into one of plural classes based on which of the plural discrete horizontal bands contain image data;

a measuring step to measure a distance between the first pair of vertical bars;

a comparing step to compare the distance between the first pair of vertical bars to one of plural predetermined distances, the one of the plural predetermined distances corresponding to the class into which the first pair of vertical bars has been classified; and a determining step to determine whether and where to cut between the first pair of vertical bars based on at least one of the classification and the comparison between the first pair of vertical bars and the one of the plural predetermined distances, wherein, for all classifications of the first pair of vertical bars, when it is determined to cut, the determining step determines to cut at one of only two locations between the first pair of vertical bars.

92. A computer-readable memory medium according to claim 91, further comprising a generating step to generate a vertical histogram of the character image data, and wherein the detecting step detects the first pair of vertical bars in the vertical histogram.

93. A computer-readable memory medium according the claim 92, further comprising a storing step to store a predetermined vertical threshold, and wherein the detecting step detects a first pair of vertical bars comprised of two vertical bars each having a vertical component that exceeds the predetermined vertical threshold.

94. A computer-readable memory medium according to claim 91, wherein the checking step checks for the presence of image data by checking for horizontal crossings on a vertical line located between the first pair of vertical bars and passing through each horizontal band.

95. A computer-readable memory medium according to claim 94, wherein the vertical line is located at a center point between the first pair of vertical bars.

96. A computer-readable memory medium according to claim 91, wherein the checking step checks for the presence of image data in each of three discrete horizontal bands.

97. A computer-readable memory medium according to claim 91, further comprising a selecting step to select character image data for character cutting which extends between a predetermined character baseline and a predetermined character maximum height line.

98. A computer-readable memory medium according to claim 91, wherein each plural discrete horizontal band has a same height.

99. A computer-readable memory medium according to claim 91, wherein the classifying step classifies the first pair of vertical bars into one of four classes of vertical bars, and wherein the checking step checks for the presence of image data in each of three discrete horizontal bands.

100. A computer-readable memory medium according to claim 99, wherein the four classes of vertical bars include
   (i) a first class of vertical bars in which (a) image data is present in only both a first horizontal band and a third horizontal band, (b) image data is present in only the first horizontal band, and (c) image data is absent from all three horizontal bands,
   (ii) a second class of vertical bars in which (a) image data is present in only both a second horizontal band and the third horizontal band, and (b) image data is present in all three horizontal bands,
   (iii) a third class of vertical bars in which (a) image data is present in only the second horizontal band, and (b) image data is present in only both the first horizontal band and the second horizontal band, and
   (iv) a fourth class of vertical bars in which image data is present in only the third horizontal band.

101. A computer-readable memory medium according to claim 100, further comprising:
   a cutting step to cut between the first pair of vertical bars when both a set of cutting conditions is satisfied and the first pair of vertical bars is classified as one of first class, second class, and fourth class; and
   a detecting step to detect a next vertical bar when the first pair of vertical bars is classified as third class, and when both the set of cutting conditions is unsatisfied and the first pair of vertical bars is classified as one of first class, second class, and fourth class.

102. A computer-readable memory medium according to claim 101, wherein the set of cutting conditions relates to whether the distance between the first pair of vertical bars is greater than one of plural predetermined distances and whether the first pair of vertical bars represents a predetermined character.

103. A computer-readable memory medium according to claim 91, wherein the two points include a center point located an equal distance from each vertical bar in the first pair of vertical bars, and an offset point located between the center point and a second vertical bar in the first pair of vertical bars.

104. A computer-readable memory medium according to claim 91, further comprising:
   a storing step to store the plural predetermined distances;
   a second storing step to store a plurality of preset characters; and
   a deciding step to decide whether a portion of the first pair of vertical bars matches one of the preset characters;
   wherein the determining step determines whether and where to cut between the first pair of vertical bars based additionally whether a portion of the first pair of vertical bars matches one of the preset characters.

105. A computer-readable memory medium according to claim 91, further comprising:
   a detecting step to detect a next vertical bar when it is determined not to cut between the first pair of vertical bars; and
   a re-executing step to re-execute the process steps for a next pair of vertical bars.

106. A computer-readable memory medium which stores computer-executable process steps to execute an optical character recognition method to recognize characters in input image data, the computer-executable process steps comprising:
   an inputting step to input image data including character image data which represents images of characters;
   a first cutting step to cut character image data out of the image data;
   a first optical character recognition processing step to perform optical character recognition processing on the cut character image data;
   a selecting step to select unrecognized cut character image data;
   a detecting step to detect a first pair of vertical bars in the unrecognized cut character image data;
   a checking step to check for a presence of character image data in each of plural discrete horizontal bands located between the first pair of vertical bars;
   a classifying step to classify the first pair of vertical bars into one of plural classes based on which of the plural discrete horizontal bands contain character image data;
   a measuring step to measure a distance between the first pair of vertical bars;
   a comparing step to compare the distance between the first pair of vertical bars to one of plural predetermined distances, the one of the plural predetermined distances corresponding to the class into which the first pair of vertical bars has been classified;
   a determining step to determine whether and where to cut between the first pair of vertical bars in the unrecognized cut character image data based on at least one of the classification and the comparison between the first pair of vertical bars and the one of the plural predetermined distances, wherein, for all classifications of the first pair of vertical bars, when it is determined to cut, the determining step determines to cut at one of only two locations between the first pair of vertical bars;
   a second cutting step to cut between the first pair of vertical bars in the unrecognized character image data when it is determined to cut between the vertical bars;
   a second optical character recognition processing step to perform optical character recognition processing on newly-cut character image data; and
   an outputting step to output recognized characters.

107. A computer-readable memory medium according to claim 106, further comprising a generating step to generate a vertical histogram of the unrecognized cut character image data, and wherein the detecting step detects the first pair of vertical bars in the vertical histogram.

108. A computer-readable memory medium according the claim 107, further comprising a storing step to store a predetermined vertical threshold, and wherein the detecting step detects a first pair of vertical bars comprised of two vertical bars each having a vertical component that exceeds the predetermined vertical threshold.

109. A computer-readable memory medium according to claim 106, wherein the checking step checks for the presence of image data by checking for horizontal crossings on a vertical line located between the first pair of vertical bars and passing through each horizontal band.

110. A computer-readable memory medium according to claim 109, wherein the vertical line is located at a center point between the first pair of vertical bars.

111. A computer-readable memory medium according to claim 106, wherein the checking step checks for a presence of image data in each of three discrete horizontal bands.

112. A computer-readable memory medium according to claim 106, wherein the selecting step selects unrecognized cut character image data for character cutting which extends between a predetermined character base line and a predetermined character maximum height line.

113. A computer-readable memory medium according to claim 106, wherein each plural discrete horizontal band has a same height.

114. A computer-readable memory medium according to claim 106, wherein the classifying step classifies the first pair of vertical bars into one of four classes of vertical bars, and wherein the checking step checks for the presence of image data in each of three discrete horizontal bands.

115. A computer-readable memory medium according to claim 114, wherein the four classes of vertical bars include (i) a first class of vertical bars in which (a) image data is present in only both a first horizontal band and a third horizontal band, (b) image data is present in only the first horizontal band, and (c) image data is absent from all three horizontal bands, (ii) a second class of vertical bars in which (a) image data is present in only both a second horizontal band and the third horizontal band, and (b) image data is present in all three horizontal bands, (iii) a third class of vertical bars in which (a) image data is present in only the second horizontal band, and (b) image data is present in only both the first horizontal band and the second horizontal band, and (iv) a fourth class of vertical bars in which image data is present in only the third horizontal band.

116. A computer-readable memory medium according to claim 115, further comprising a detecting step to detect a next vertical bar when the first pair of vertical bars is classified as third class, and when both a set of cutting conditions is unsatisfied and the first pair of vertical bars is classified as one of first class, second class, and fourth class, and wherein the cutting step cuts between the first pair of vertical bars when both the set of cutting conditions is satisfied and the first pair of vertical bars is classified as one of first class, second class, and fourth class.

117. A computer-readable memory medium according to claim 116, wherein the set of cutting conditions relates to whether the distance between the first pair of vertical barks is greater than the one of the plural predetermined distances and whether the first pair of vertical bars represents a predetermined character.

118. A computer-readable memory medium according to claim 106, wherein the two points include a center point located an equal distance from each vertical bar in the first pair of vertical bars, and an offset point located between the center point and a second vertical bar in the first pair of vertical bars.

119. A computer-readable memory medium according to claim 106, further comprising:

a storing step to store a plurality of predetermined distance conditions;

a second-storing step to store a plurality of preset characters; and a deciding step to decide whether a portion of the first pair of vertical bars matches one of the preset characters;

wherein the determining step determines whether and where to cut between the first pair of vertical bars based additionally on whether a portion of the first pair of vertical bars matches one of the preset characters.

120. A computer-readable memory medium according to claim 106, further comprising:

a detecting step to detect a next vertical bar when it is determined not to cut between the first pair of vertical bars; and a re-executing step to re-execute the process steps for a next pair of vertical bars.

* * * * *

UNITED STATES PATENT AND TRADEMARK OFFICE
CERTIFICATE OF CORRECTION

PATENT NO. : 5,809,166

DATED : September 15, 1998

INVENTORS : HUNG KHEI HUANG

It is certified that error appears in the above-identified patent and that said Letters Patent is hereby corrected as shown below:

COLUMN 6

Line 17, change "component" to --component in the histogram--.

Line 18, change "bar in the histogram," to --bar,--.

Line 19, delete "in the histogram".

COLUMN 7

Line 19, change "where" to --where a cut between--.

Line 20, change "are cut" to --is made--.

COLUMN 13

Line 38, change "the claim 2," to --to claim 2,--.

COLUMN 15

Line 19, change "the" to --to--.

Line 20, change "means-for" to --means for--.

UNITED STATES PATENT AND TRADEMARK OFFICE
CERTIFICATE OF CORRECTION

PATENT NO. : 5,809,166

DATED : September 15, 1998

INVENTORS : HUNG KHEI HUANG

It is certified that error appears in the above-identified patent and that said Letters Patent is hereby corrected as shown below:

COLUMN 17

Line 17, change "the" to --to--.

COLUMN 19

Line 1, change "the-comparision" to --the comparision--.

Line 21, change "the" to --to--.

COLUMN 20

Line 67, change "Pair" to --pair--.

COLUMN 21

Line 8, change "the" to --to--.

COLUMN 23

Line 9, change "the" to --to--.

UNITED STATES PATENT AND TRADEMARK OFFICE
CERTIFICATE OF CORRECTION

PATENT NO. : 5,809,166

DATED : September 15, 1998

INVENTORS : HUNG KHEI HUANG

It is certified that error appears in the above-identified patent and that said Letters Patent is hereby corrected as shown below:

COLUMN 24

Line 66, change "the" to --to--.

COLUMN 27

Line 4, change "the" to --to--.

Line 24, change "base line" to --baseline--.

COLUMN 28

Line 16, change "barks" to --bars--.

Line 24, change "the-center" to --the center--.

Line 31, change "second-storing" to --second storing--.

Signed and Sealed this

Twenty-fourth Day of August, 1999

Attest:

Q. TODD DICKINSON

*Attesting Officer*    *Acting Commissioner of Patents and Trademarks*